US008880694B2

(12) United States Patent
Kamei et al.

(10) Patent No.: US 8,880,694 B2
(45) Date of Patent: Nov. 4, 2014

(54) SERVER SYSTEM AND CONTROL METHOD FOR SAME

(75) Inventors: Hitoshi Kamei, Sagamihara (JP); Atsushi Sutoh, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1450 days.

(21) Appl. No.: 12/128,339

(22) Filed: May 28, 2008

(65) Prior Publication Data

US 2009/0248870 A1  Oct. 1, 2009

(30) Foreign Application Priority Data

Mar. 26, 2008  (JP) .................................. 2008-081058

(51) Int. Cl.
*G06F 15/173* (2006.01)
*H04L 29/08* (2006.01)

(52) U.S. Cl.
CPC ............ *H04L 67/06* (2013.01); *H04L 67/1029* (2013.01); *H04L 67/1002* (2013.01); *H04L 67/1097* (2013.01)
USPC .......................................................... 709/225

(58) Field of Classification Search
CPC .. H04L 67/1029; H04L 67/06; H04L 67/1002
USPC ........................................................ 709/225
See application file for complete search history.

(56) References Cited

U.S. PATENT DOCUMENTS

| | | | | |
|---|---|---|---|---|
| 6,968,379 B2* | 11/2005 | Nielsen | ....................... | 709/226 |
| 6,969,379 B1* | 11/2005 | Aboul-Hosn et al. | ........ | 604/507 |
| 7,062,567 B2* | 6/2006 | Benitez et al. | ................ | 709/231 |
| 7,636,917 B2* | 12/2009 | Darling et al. | ................ | 718/105 |
| 7,706,303 B2* | 4/2010 | Bose et al. | ..................... | 370/254 |
| 2002/0091825 A1* | 7/2002 | Shuster | ......................... | 709/226 |
| 2002/0133491 A1* | 9/2002 | Sim et al. | ....................... | 707/10 |
| 2004/0143608 A1* | 7/2004 | Nakano et al. | ................ | 707/204 |
| 2004/0221319 A1* | 11/2004 | Zenoni | .......................... | 725/132 |
| 2004/0228277 A1* | 11/2004 | Williams | ....................... | 370/230 |
| 2005/0086491 A1* | 4/2005 | Haugh et al. | .................. | 713/182 |
| 2005/0120160 A1* | 6/2005 | Plouffe et al. | ..................... | 711/1 |
| 2005/0216535 A1* | 9/2005 | Saika et al. | ..................... | 707/204 |
| 2007/0226328 A1* | 9/2007 | Kusama et al. | ............... | 709/223 |
| 2008/0104216 A1* | 5/2008 | Ponnappan et al. | .......... | 709/223 |
| 2009/0007112 A1* | 1/2009 | Moriki et al. | ..................... | 718/1 |
| 2009/0193146 A1* | 7/2009 | Albert et al. | ................... | 709/241 |

FOREIGN PATENT DOCUMENTS

| | | |
|---|---|---|
| JP | 2004-227127 | 8/2004 |
| JP | 2007-233783 | 9/2007 |

* cited by examiner

*Primary Examiner* — Krista Zele
*Assistant Examiner* — James Forman
(74) *Attorney, Agent, or Firm* — Brundidge & Stanger, P.C.

(57) ABSTRACT

The server system includes a server apparatus transmitting and receiving file data based on an access request transmitted from a client apparatus; and a management apparatus managing the server apparatus, wherein the server apparatus includes a plurality of virtual server parts controlling transmission and reception of the data independently for each of the predetermined client apparatuses; a data flow configuration part configuring a data flow for each of the file data transmitted to and received by the virtual server parts based on a command from the management apparatus; and a load control part controlling a data flow for each of the file data to control load of the virtual server parts based on the data flow for each of the file data configured by the data flow configuration part.

2 Claims, 32 Drawing Sheets

FIG.8

| FILE PATH 84A | READ AMOUNT 84B | WRITE AMOUNT 84C | TOTAL READ AMOUNT 84D | TOTAL WRITE AMOUNT 84E | READ TIME 84F | WRITE TIME 84G |
|---|---|---|---|---|---|---|
| /mnt/file3 | 10MB/s | 10MB/s | 2000MB | 2000MB | 1201173425 | 1201173586 |
| ... | ... | ... | ... | ... | ... | ... |

| FILE SERVER ID (30A) | VIRTUAL SERVER ID (30B) | READ AMOUNT (30C) | WRITE AMOUNT (30D) |
|---|---|---|---|
| 00001 | 1000001 | 10MB/s | 10MB/s |
| ⋮ | ⋮ | ⋮ | ⋮ |

FIG.12

| FILE SERVER ID (31A) | VIRTUAL SERVER ID (31B) | FILE PATH (31C) | READ AMOUNT (31D) | WRITE AMOUNT (31E) |
|---|---|---|---|---|
| 000001 | 100001 | /mnt/file1 | 10MB/s | 10MB/s |
| 000001 | 100001 | OTHERS | 1MB/s | 10MB/s |

FIG.38

| FILE SERVER ID | VIRTUAL SERVER ID | HIGHLY-LOADED OPERATION | OPTION |
|---|---|---|---|
| 000001 | 100001 | I/O HALT | 10 SECONDS |
| 000001 | 100002 | FAIL OVER | TO 000002 |
| 000002 | 100010 | I/O HALT | 30 SECONDS |

FIG.39

| COMMAND NUMBER | VIRTUAL SERVER ID | OPERATION | OPTION |
|---|---|---|---|

SERVER SYSTEM AND CONTROL METHOD FOR SAME

CROSS-REFERENCES TO RELATED APPLICATIONS

This application relates to and claims priority from Japanese Patent Application No. 2008-081058, filed on Mar. 26, 2008, the entire disclosure of which is incorporated herein by reference.

BACKGROUND

The invention relates to a server system and a control method for the same. The present invention is preferably applicable for a file sharing server providing a virtual server environment, for example.

Conventionally, such a system that one file sharing server provides a plurality of virtual file sharing servers (hereinafter referred to as virtual server, virtual NAS (Network Attached Storage)) to integrate a large number of file sharing servers is widely known.

Integration of a plurality of file sharing servers to one file sharing server is effective for simplifying management of file sharing servers, establishment of power saving by suppressing power consumed by the file sharing server. There is an OS (Operating System) division method as a system which provides that virtual server, A virtual server is realized by an OS division method in which function provided by physical device such as a disc and a network adapter and an OS such as process space and Name Space is divided for each virtual server. The OS division method alleviates the load on OS resource management process by standardizing memory management and process management module among virtual servers.

On the other hand, there is N-way cluster technology where a plurality of file sharing servers for providing virtual servers are used and causing the virtual servers are moved (hereinafter to be referred to as virtual server migration or failover) among those file sharing servers. According to that technology, maintainability such as countermeasure for file sharing server fault and replace of file sharing servers can be realized.

Moreover, the N-way cluster technology realizes an appropriate load balancing for the entire cluster by moving the virtual servers among the file sharing servers based on I/O (Input/Output) load information of the virtual servers. Here, Japanese Patent Application Laid-open No. 2004-227127 is known as patent describing a method of realizing a virtual OS related to the virtual server. In addition, Japanese Patent Application Laid-open No. 2007-233783 is known as a method of obtaining I/O load information by a storage to carry out load balancing.

In the N-way cluster technology, I/O load information is obtained for every virtual server in order to realize appropriate load balancing. In addition, in the N-way cluster technology, the virtual server is temporarily halts. The halt virtual server is started up by another file sharing server. Such an arrangement enables a virtual server to move to another file sharing server to establish load balancing.

In the N-way cluster technology, currently, a method of obtaining access information for every disc is adopted as a method of obtaining a load. That is, for the N-way cluster technology, access information (I/O information) on a disc allocated to a certain virtual server is obtained; the operation state of the virtual server is estimated; and, thereby, movement of the virtual server is controlled.

Here, in the case of estimating the operation state of a virtual server based on access information of the disc, the total I/O amount will be an amount of adding all disc access of the virtual servers. For example, in the case where disc access taking place in file copying and the process such as file data search are carried out simultaneously, the I/O amount of those two processes is summed and, thereby, the operation state of the virtual servers is estimated in the N-way cluster technology. Therefore, the N-way cluster technology cannot determine whether the disc access is important data process.

Accordingly, current the operation state estimation on the virtual servers based on total I/O amount on disc access gives rise to such a problem that unnecessary movement of virtual servers takes place.

In the case of the preceding example, the process such as file copy that is not so important causes occurrence of virtual server movement. For movement of the virtual servers, service is temporarily suspended and, therefore, delay in important process such as file data search occasionally takes place.

In addition, according to the type of file access protocol, connection is occasionally disconnected to halt an operation of a client apparatus connected to the file sharing server. Since the movement of a virtual server accompanies a halt and startup of the virtual server, the load to the file sharing server is heavy. Accordingly, the unnecessary movement of the virtual server has to be avoided as much as possible.

SUMMARY

The present invention has been attained in consideration of the above described points, and proposes a server system capable of improving access performance and a control method thereof.

In order to solve such a problem, the present invention is a server system, which includes a server apparatus transmitting and receiving file data based on an access request transmitted from a client apparatus; and a management apparatus managing the server apparatus, wherein the server apparatus comprises a plurality of virtual server parts controlling transmission and reception of the file data independently for each of the predetermined client apparatus; a data flow configuration part configuring a data flow for each of the file data transmitted and received by the virtual server parts based on a command from the management apparatus; and a load control part controlling a data flow for each of the file data to control a load of the virtual server parts based on the data flow for each of the file data configured by the data flow configuration part.

In addition, the present invention is a control method of a server system including a server apparatus transmitting and receiving file data based on an access request transmitted from a client apparatus; and a management apparatus administrating the server apparatus, wherein a data flow configuration part comprises: a first step where a data flow configuration part configures a data flow for each of the file data of a plurality of virtual server parts controlling transmission and reception of the file data independently for each of the predetermined client apparatuses based on a command from the management apparatus; and a second step where a load control part controls a data flow for each of the file data to control a load of the virtual server parts based on the data flow for each of the file data configured in the first step.

Accordingly, in a server apparatus in which a plurality of virtual server parts operates, an administrator can get load information of the virtual server parts accurately and can control data flow for every file data. Therefore, even in the case a large load occurs in a particular virtual server part, process performance degradation of the other virtual server part can be suppressed.

That is, in the present invention, by suppressing I/O flow for every file data, only I/O targeted to unimportant file data can be suppressed.

Moreover, in the present invention, by expanding I/O tolerance of important file data, important process can be made to be processed immediately. The administrator of the server apparatus configures the I/O flow of the file data. Moreover, in the present invention, by not moving the virtual server parts in the case where reading and writing occur for important file data, delay in important process is prevented. In order to determine whether the data process is important, the I/O amount for every file data is made searchable. In addition, in the present invention, by suppressing the I/O flow for every file data, unnecessary movement of the server part can be suppressed.

On the other hand, in the present invention, an administrator can manage access information for each file data in a concentrated manner to provide for the operation of each virtual server part at the time of occurrence of a heavy load. In the present invention, by software for managing the cluster actively moving NAS where the virtual server operates works, performance of the virtual server part can be improved. In addition, in the present invention, by restraining the I/O flow of the entire virtual server part, the operation of the virtual server is restrained for a certain time period.

Accordingly, I/O information of the file data of server apparatus providing the virtual server part can be obtained and, moreover, the I/O flow control can be carried out appropriately. Consequently, movement of the virtual server part in the midst of working on important file data can be prevented. Moreover, by restraining reading and writing onto unimportant file data, unnecessary movement of the virtual server part can be prevented. In addition, an administrator manages the access management information for each file data in a concentrated manner, the entire server system can be appropriately operated based on the access management information.

According to the present invention, a server system capable of improving access performance and a control method thereof can be realized.

Other aspects and advantages of the invention will be apparent from the following description and the appended claims.

BRIEF DESCRIPTION OF THE DRAWINGS

FIG. 8 is a diagram illustrating an example of file I/O statistics information.

FIG. 11 is a diagram illustrating an example of virtual server I/O amount configuration information.

FIG. 12 is a diagram illustrating an example of file I/O amount configuration information.

FIG. 38 is a diagram illustrating an example of N-way management data of the embodiment 2.

FIG. 39 is a diagram illustrating an example of an N-way corresponding request command of the embodiment 2.

DETAILED DESCRIPTION OF PREFERRED EMBODIMENTS

Embodiments of the present invention will be described below with a method, as an example, of obtaining file I/O information to control file I/O flow for each virtual server in a file sharing server providing a virtual server. In addition, embodiments to be described below are examples and the present invention will not be limited to these embodiments.

(1) Embodiment 1

Figure 1:
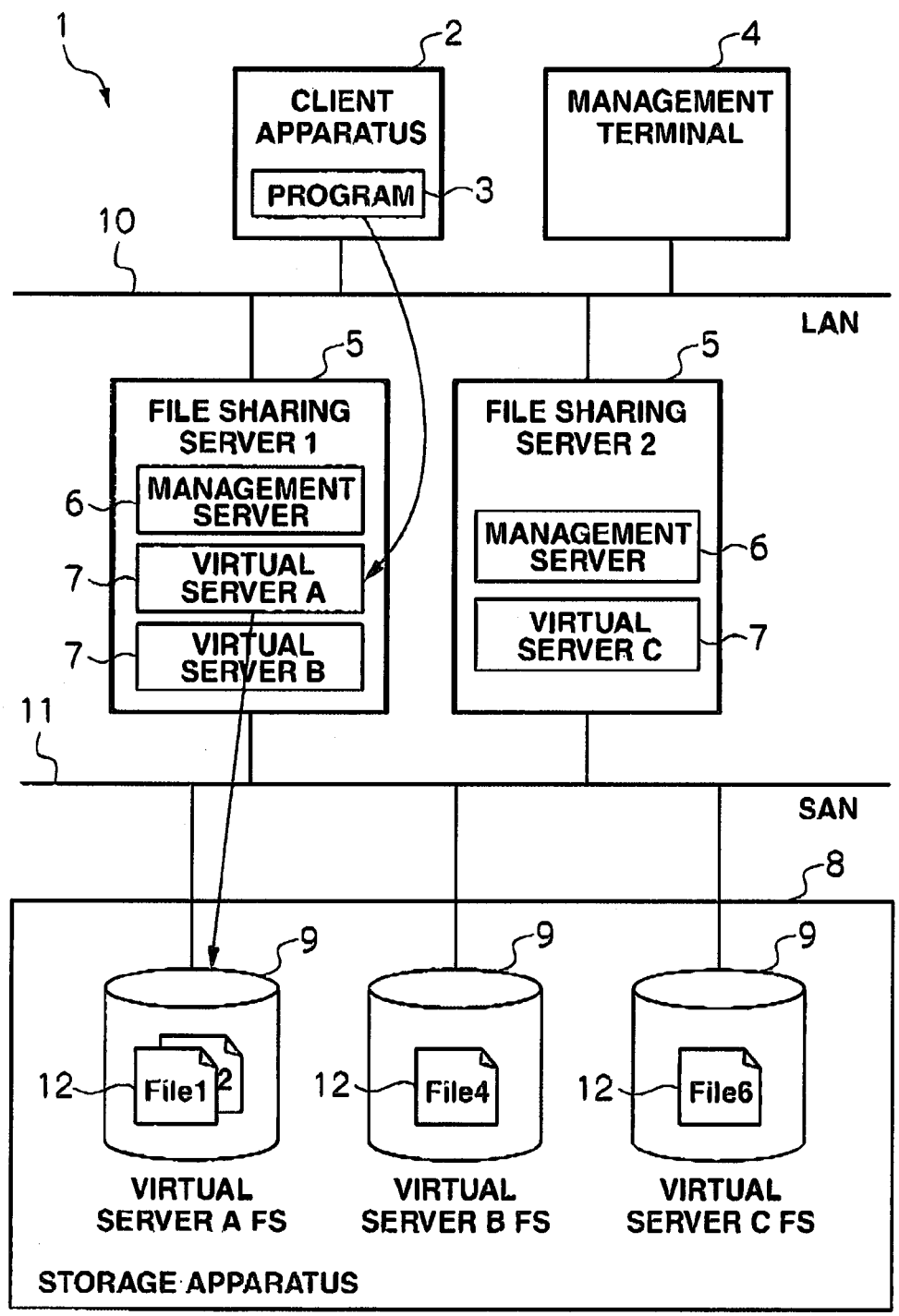
FIG. 1 is a diagram illustrating an example of a file sharing system in which a file sharing server operates a virtual server.

FIG. 1 is a block diagram illustrating relation between a file sharing server 5 and virtual server 7 actually providing file sharing service in a file sharing system 1 related to the present embodiment. A system configuration in detail of the present embodiment will be described with FIG. 2.

The file sharing system 1 is configured by a client apparatus 2, a program 3 operated in the client apparatus 2, a management terminal 4, a file sharing server 5, a management server 6 and a virtual server 7 operated in the file sharing server 5, storage 8 and a virtual server file system (hereinafter to be referred to as virtual server FS (File System)) 9 of the storage 8 being a file system that the virtual server 7 utilizes. In addition, the client apparatus 2, the management terminal 4 and the file sharing server 5 are mutually brought into connection by LAN (Local Area Network) 10. On the other hand, the file sharing server 5 and the virtual server FS 9 are mutually brought into connection by SAN (Storage Area Network) 11.

The client apparatus 2 is a terminal for a user to utilize file sharing service provided by the virtual server 7 of the file sharing server 5. In the client apparatus 2, a program 3 utilized by a user is in operation.

The management terminal 4 is a terminal managing the entire file sharing system 1.

The file sharing server 5 i's a server in which the management server 6 and the virtual server 7 operate. The management server 6 is a virtual server for managing the file sharing server 5 and the virtual server 7. On the other hand, the virtual server 7 is a virtual server for providing the client apparatus 2 with file sharing service.

The storage 8 is a terminal saving a file (File) 12 of the client apparatus 2.

The virtual server FS 9 is a file system utilized by the virtual server 7. Each virtual server 7 utilizes respectively different file system. In addition, the virtual server FS 9 stores the file 12.

In FIG. 1, the program 3 of the client apparatus 2 requests for service to the virtual server A (1007) of the file sharing system 1 (file sharing server 5). And the virtual server A (virtual server 7) obtains a file 12 stored in the virtual server FS 9 of the virtual server A (virtual server 7) in the storage 8. And the virtual server A (virtual server 7) returns the acquisition result to the program 3 of the client apparatus 2.

Figure 2:
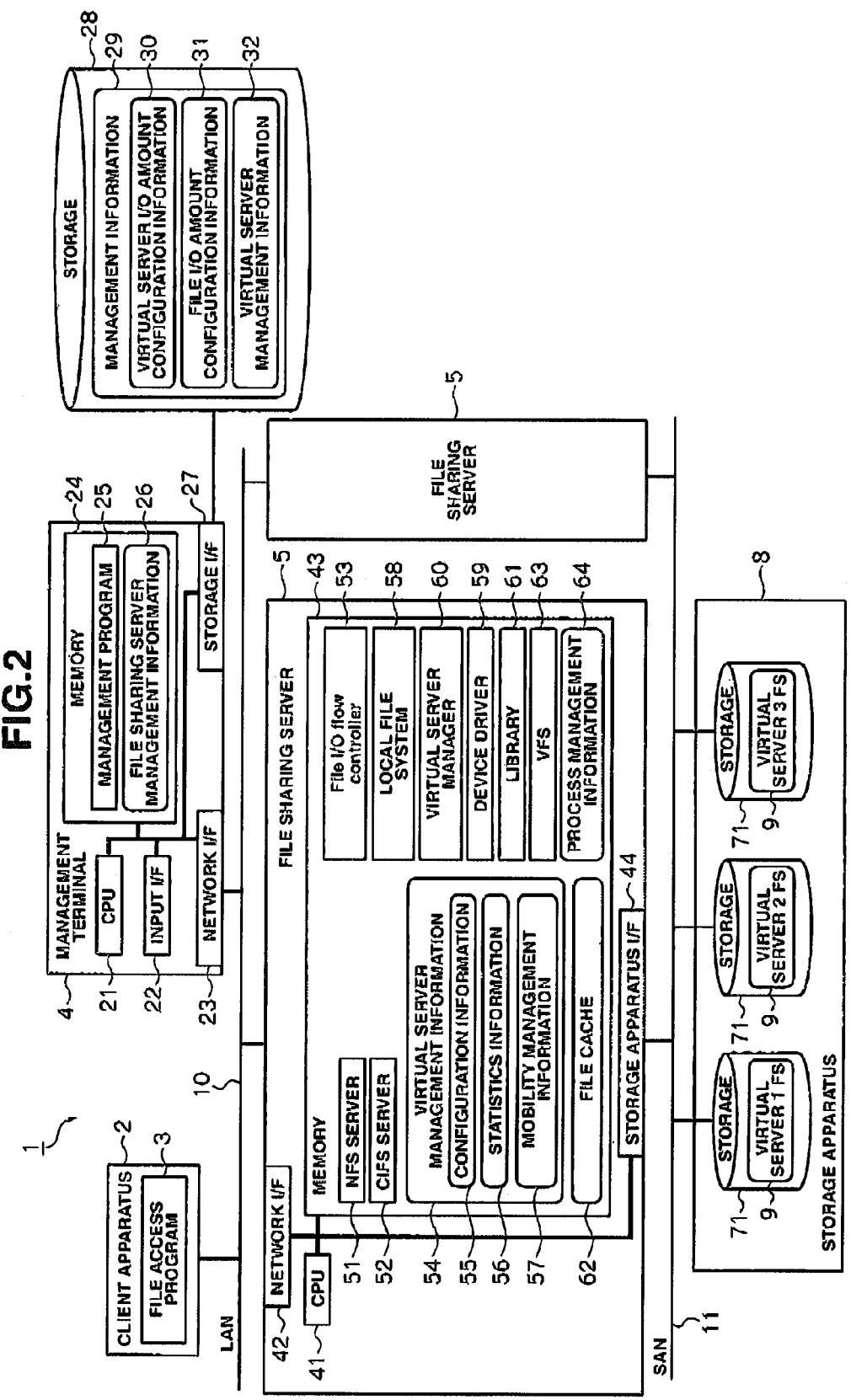
FIG. 2 is a diagram illustrating an example of a system configuration of a file sharing system.

FIG. 2 is a diagram illustrating a detailed example of a configuration of a file sharing system 1.

The client apparatus 2 is a terminal used by a user utilizing the file sharing system 1. In the client apparatus 2, a file access program 3 operates to make an access to file sharing service provided by the file sharing server 5.

The management terminal 4 has a CPU (Central Processing Unit) 21, an input I/F (Interface) 22, a network I/F 23, memory 24 and a storage I/F 27, which are mutually brought into connection by an inner communication path.

In the memory 24, a management program 25 and file sharing server management information 26 are stored. The management program 25 is a program managing the entire file sharing system 1. The CPU 21 requests for an input of configuration information to an administrator of the file sharing system 1 through the input I/F 22 when the management program is executed. And the CPU 21 saves its configuration information to the management information 29 of the file sharing server management information 26 and the management information 29 of the storage 28. Moreover, the CPU 21 transmits the configuration information to the file sharing server 5 through the network I/F 23.

The management information 29 includes virtual server I/O amount configuration information 30, file amount configuration information 31 and virtual server management information 32. The respective information will be described in detail later.

The file sharing server 5 has a CPU 41, a network I/F 42, memory 43 and storage I/F 44, which are mutually brought into connection through an inner communication path.

An NFS (Network File System) server 51, a CIFS (Common Internet File System) server 52, a file I/O flow controller 53, virtual server management information 54, configuration information 55, statistics information 56, mobility management information 57, a local file system 58, a device driver 59, virtual server manager 60, a library 61, a file cache 62, VFS (Virtual File System) 63 and process management information 64 are stored in the memory 43.

The NFS server 51 and the CIFS server 52 are programs providing file sharing service. The CPU 41 executes the NFS server 51 and the CIFS server 52 and, then, waits for a file access request from the file access program 3 of the client apparatus 2. The CPU 41 accepts the file access request from the file access program 3 through the network I/F 42; then reads in the data from the virtual server FS 9 being present in the storage 71 through the storage 71 of the storage 8; and transmits the data to the file access program 3.

A file I/O flow controller 53 is a program controlling flow of the file I/O based on information recorded in the configuration information 55 of the virtual server management information 54. Moreover, the file I/O flow controller 53 is a program recording file 110 status to statistics information 56 of the virtual server management information 54. The CPU 41 executes the file I/O flow controller 53 and, then, reads in the configuration information 55 to execute flow control according to the contents thereof. In addition, the CPU 41 records the file 110 status to the statistics information 56. Details of the file I/O flow controller 53 will be described later.

The virtual server management information 54 contains the configuration information 55, the statistics information 56 and the mobility management information 57.

The configuration information 55 and the statistics information 56 of the virtual server management information 54 are prepared for each virtual server 7. That is, the configuration information 55 and the statistics information 56 are prepared as a part of the virtual server management information 54 being the management information of the virtual server 7. The configuration information 55 and the statistics information 56 will be described in detail later.

The mobility management information 57 of the virtual server management information 54 is management information for determining whether the virtual server 7 to be moved can be moved at the occasion where virtual server manager 60 moves the virtual server 7 from a loaded state of the virtual server 7. The mobility management information 57 is included in the virtual server management information 54. Details of the mobility management information 57 will be described.

A local file system 58 is a program managing the virtual server FS 9 of the storage 71 of the storage 8. The CPU 41 executes the local file system 58 and, then operates the file stored in the virtual server FS 9 of the storage 71 of the storage 8.

The device driver 59 is a program controlling an access to the data (file 12) stored in the storage 71 of the storage B. The CPU 41 executes the local file system 58 and, at the occasion of operating the virtual server FS 9 of the storage 71 of the storage 8, executes the device driver 59 to operate the storage 71 of the storage 8.

The virtual server manager 60 is a program managing the virtual server 7 provided by the file sharing server 5. The virtual server manager 60 can be in the management server 6 and can be in the virtual server 7. The CPU 41 executes the virtual server manager 60 and, then receives configuration information of the virtual server 7 from the management program 25 of the management terminal 4 to record the configuration information in the virtual server management information 54. Moreover, the CPU 41 starts up the virtual server 7 based on the virtual server management information 54. In addition, in the case where the CPU 41 is requested for obtaining statistics information by the management program 25, the CPU 41 obtains the statistics information 56 and transmits the statistics information to the management program 25 through the networks I/F 44 and 23. The details on the virtual server manager 60 will be described later.

The library 61 is an intermediate program utilized at the occasion where the CIFS server 52 requests the local file system 58 for a file access to.

The file cache 62 is a memory region for temporarily saving the file 12 stored in the virtual server FS 9 in the memory 43. In the case of making an access to the file 12, the local file system 58 examines the file cache 62 at first. The CPU 41 executes the file system 58 to obtain the file data from the file cache 62 in the case where the file cache 62 retains the file data (file 12). On the other hand, the CPU 41 executes the local file system 58 to obtain the file data (file 12) from the storage 71 of the storage 8 through the device driver 59 in the case where the file cache 62 does not retain the file data (file 12). Details of the VFS 63 will be described later.

The process management information 64 is information for managing process such as an NFS server 51 and a CIFS server 52, which are operated by the file sharing server 5.

The storage 71 of the storage 8 is a storage storing the file system used in the file sharing service and is hard disc, optical disc and the like. In addition, the storage 71 of the storage 8 can be a disc array system.

Here, below, in order to clarify the contents of the process by the CPU 41 of the management terminal 4 based on the respective programs or by the CPU 43 of the file sharing sever 5, the process main body of the respective process will be occasionally described as a program. However, it goes without saying that actually, based on the program, the corresponding CPUs 21 and 43 carry out the process.

Figure 3:
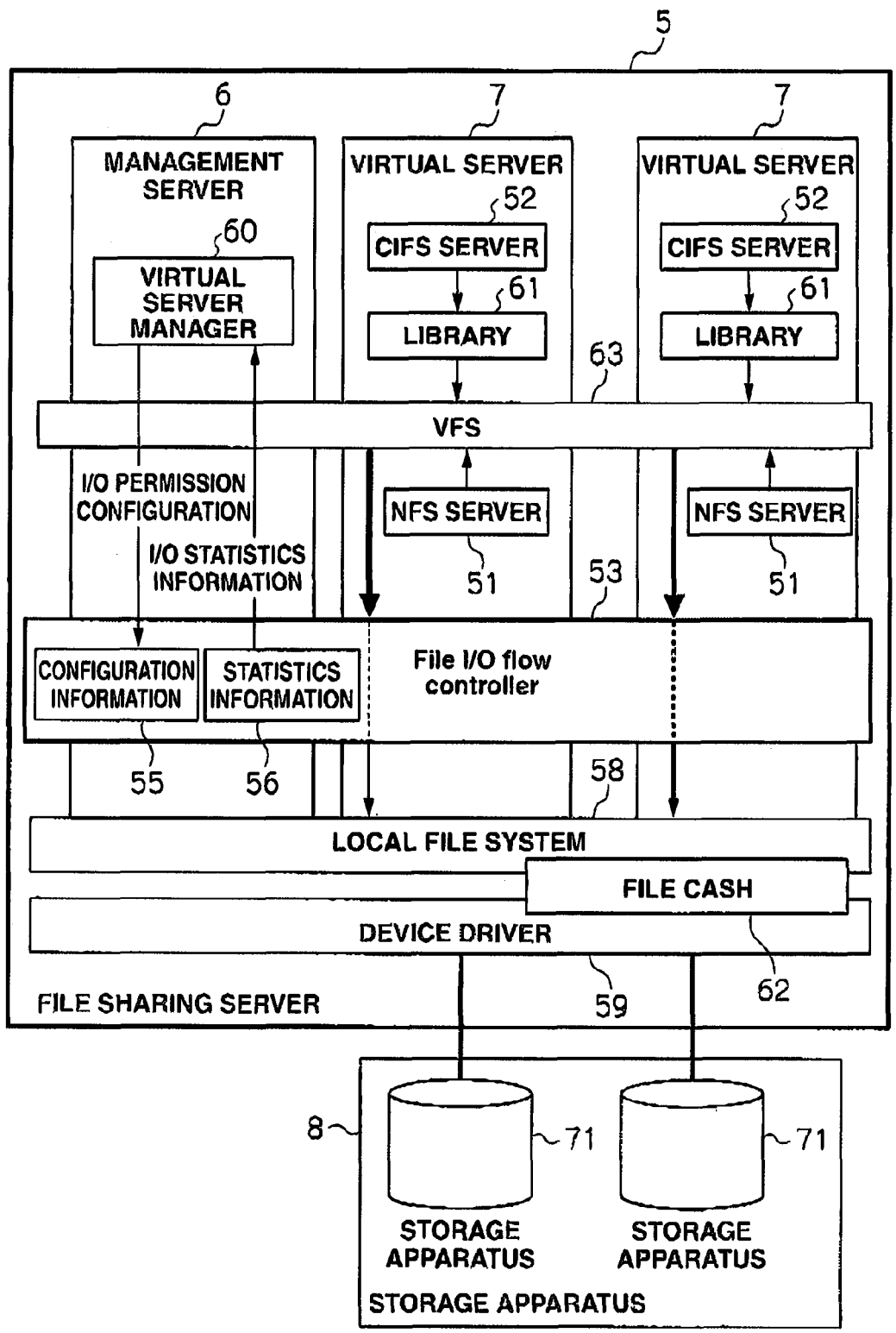
FIG. 3 is a diagram illustrating an example of an operation summary of the present invention.

FIG. 3 is a block diagram illustrating a software logical configuration of the file sharing server 5. Based on the block diagram of FIG. 3, an operation summary of the present invention will be described.

In the file sharing server 5, the management server 6 and the virtual server 7 are prepared in its inside. There can be one virtual server 7 or there can be a plurality of virtual servers 7.

The virtual server manager 60 of the management server 6 makes an I/O permission configuration request and an I/O statistics information request to the file I/O flow controller 53. The file I/O flow controller 53 controls flow of the file I/O based on the configuration information 55.

The CIFS server 52 of the virtual server 7 receives a file access request from the file access program 3 of the client apparatus 2. And the CIFS server 52 requests the library 61 for a file access. Next, the library 61 requests the VFS 63 for a file access and the VFS 63 requests the file I/O flow controller 53 for a file access. Then, the file I/O flow controller 53 requests the local file system 58 for a file access to check the file cache 62 of the local file system 58 and determine whether a request for data acquisition should be made to the device driver 59. The local file system 58 makes an access to the storage 71 of the storage 8 through the device driver 59 in the case where no data were found out from the file cache 62.

Thus, the file sharing server 5 calls up the program one after another from the CIFS server 52 and, thereby, realizes an access to the file 12 of the virtual server FS 9 inside the storage 71 of the storage 8. In the present invention, the file I/O flow controller 53 controls file I/O flow between the VFS 63 and the local file system 58. In the present invention, by controlling the file I/O flow between the VFS 63 and the local file system 58, an influence to the I/O flow determination of the file cache 62 can be eliminated.

Figure 4:
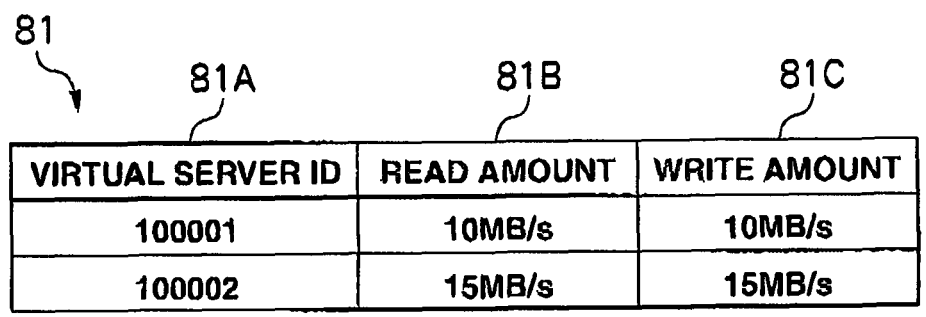
FIG. 4 is a diagram illustrating an example of a virtual server I/O flow table.

FIG. 4 is a diagram illustrating an example of a virtual server I/O flow table 81 included in the configuration information 55.

The virtual server I/O flow table 81 is a table in which the virtual server ID 81A to become an object for flow control and the READ (read) amount 81B as well as the WRITE (write) amount 81C corresponding to that virtual server ID are registered in the corresponding manner. The file I/O flow controller 53 controls I/O flow for each virtual server 7 based on information of that virtual server I/O flow table 81.

That virtual server I/O flow table 81 is used for determining the upper limit of the I/O amount of the entire virtual server 7. For example, in the case of FIG. 4, for the virtual server ID "100001" indicated in the virtual server ID 81, the upper limit of the READ amount 81B of the entire program being operated inside the virtual server 7 will be 10 (MB/s). In addition, the upper limit of the WRITE amount of the relevant virtual server ID "100001" will be 10 (MB/s). Thus, for the virtual server I/O flow table 81, the upper limit can be configured for each virtual server 7.

Figure 5:
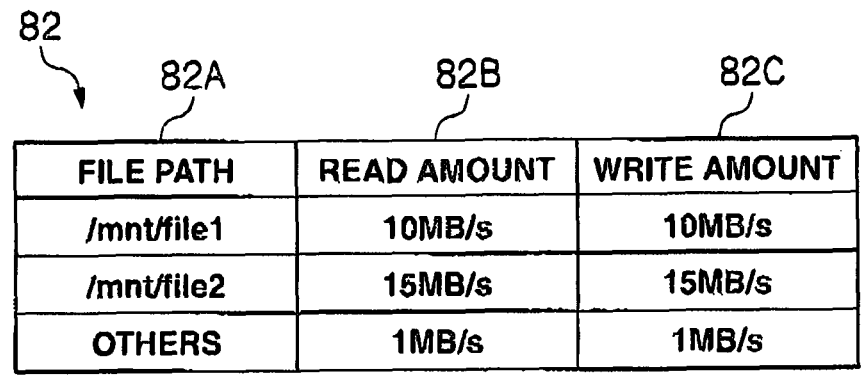
FIG. 5 is a diagram illustrating an example of a file I/O flow table.

FIG. 5 is a diagram illustrating an example of a file I/O flow table 82 included in the configuration information 55.

The file I/O flow table 82 is a table in which the file path 82A to become an object for control and the READ (read) amount 82B as well as the WRITE (write) amount 82C corresponding to that file path 82A are registered in a corresponding manner. The file I/O flow table 82 is configured for each virtual server 7 respectively. The file path 82A is a path in a file name space constructed by the virtual server 7. Accordingly, the file path 82A cannot configure a path for a different virtual server 7.

The file I/O flow controller 53 controls I/O flow for each file 12 of the virtual server 7 based on information of that file I/O flow table 82. The file I/O flow controller 53 configures a file 12, which is taken as "important" or "unimportant", to the file path 82A based on an operation by an administrator of the file sharing system 1 and configures the corresponding READ amount 82B and the WRITE amount 82C.

For example, in the case of FIG. 5, an administrator considers "/mnt/file1" configured in the file path 82A to be important and configures the READ amount 82B and the WRITE amount 82C of the file 12 to 10 (MB/s) respectively. On the other hand, "others" configured in the file path 82A is for all the file paths 82A not illustrated in FIG. 5. The READ amount 82B and the WRITE amount 82C of those files 12 are suppressed to 1 (MB/s).

By using the virtual server I/O flow table 81 and the file I/O flow table 82 illustrated in FIG. 4 and FIG. 5, flow of the file I/O can be provided.

With the virtual server I/O flow table 81, the file I/O flow controller 53 can restrain for a certain virtual server 7 to use the file sharing server 5 in a concentrated manner in the case of a plurality of virtual servers 7 is operating.

On the other hand, the file I/O flow controller 53 enables a large amount of data access on an important file 12, in which flow of the READ amount 82B and the WRITE amount 82C are configured largely, by the file I/O flow table 82. On the other hand, the file I/O flow controller 53 enables only a small amount of data access on the other files. Thereby, the file sharing server 5 can avoid occurrence of a heavy load in the case where a large amount of data access requests is made to the file 12 belonging to the other files. Consequently, the file sharing server 5 will become possible to restrain mobility of the virtual server 7 due to unnecessary data access.

Figure 6:
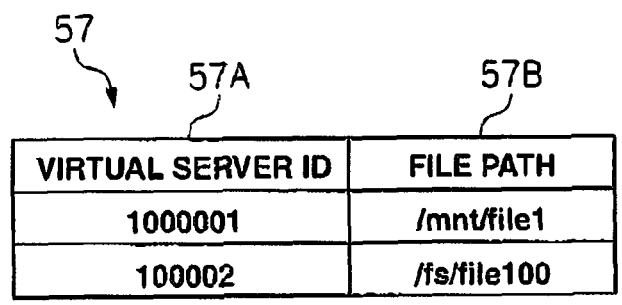
FIG. 6 is a table illustrating an example of mobility management information.

FIG. 6 is a table illustrating an example of mobility management information 57. The mobility management information 57 is configured by the virtual server ID 57A and the file path 57B making a pair. The program actually using these data is the virtual server manager 60.

The virtual server manager 60 halts mobility process of the virtual server 7 in the case where the process being in operation in the virtual server ID 57A is reading and writing the file 12 indicated by the file path 57B. The mobility management information 57 is configured by an administrator. For example, FIG. 6 illustrates that mobility of the virtual server is restrained in the case where the administrator considered the file "/mnt/file1" of the virtual server ID "10000001" to be important and is reading and writing this file. An operation of the virtual server manager 60 will be described in detail later.

Figure 7:
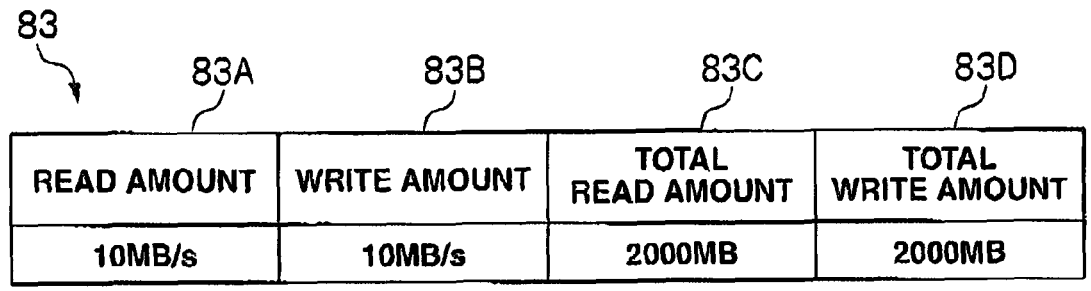
FIG. 7 is a diagram illustrating an example of virtual server I/O statistics information.

FIG. 7 is a diagram illustrating virtual server I/O statistics information 83 included in the statistics information 56.

The virtual server I/O statistics information 83 is a table including a READ amount 83A, WRITE amount 83B, total READ amount 83C and a total WRITE amount 83D. The READ amount 83A, and the WRITE amount 83B are tables illustrating whether reading and writing has occurred at the time of obtaining the virtual server I/O statistics information 83. The total READ amount 83C and the total WRITE amount 83D are information indicating the total amount from the start of obtaining the virtual server I/O statistics information 83.

FIG. 8 is a diagram illustrating a file I/O statistics information 84 included in the statistics information 56.

The file I/O statistics information 84 is a table including the file path 84A, the READ amount 84B, the WRITE amount 84C, the total READ amount 84D, the total WRITE amount 84E, READ time 84F and WRITE time 84G.

The READ amount 84B and the WRITE amount 84C are an amount of reading and writing at the time point when the statistics information is obtained. The total READ amount 84D and the total WRITE amount 84E are the total amount of reading and writing of the file 12 after the virtual server is started up. The READ time 84F and the WRITE time 84G indicate the time when the file 12 is read and written.

By using the statistics information 56 illustrated in FIG. 7 and FIG. 8, the file sharing system 1 allows an administrator of the relevant file sharing system 1 to obtain the virtual server I/O statistics information 83 and the file I/O statistics information 84 for each virtual server 7. In addition, the file sharing system 1 allows an administrator to configure the virtual server I/O flow table 81 and the file I/O flow table 82 based on the information thereof, For example, the administrator confirms the file I/O statistics information 84 for an unimportant file ("/mnt/file3" in the case of FIG. 8) to determine that I/O is generated in large amount, and, then, configures to decrease the READ amount 82B and the WRITE amount 83C of the file I/O flow table 82. After that configuration, the file I/O flow controller 53 controls the I/O flow based on the information of that file I/O flow table 82.

When the file access program 3 of the client apparatus 2 makes an access to the file 12, the file I/O flow controller 53 updates the file I/O statistics information 84. Here, the READ amount 84B and the WRITE amount 84C are information specifying how much reading and writing take place when the file I/O statistics information 84 is acquired. In addition, the total READ amount 84D and the total WRITE amount 84E are information specifying the total amount of reading and writing after acquisition of the statistics information 56 starts. In addition, the READ time 84F and the WRITE time 84G are information specifying the time of making an access to the file 12.

Figure 9:
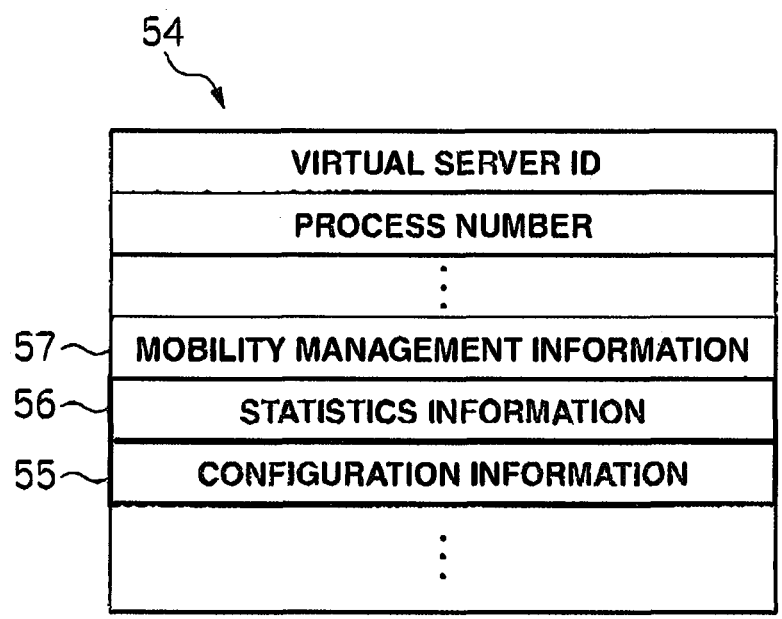
FIG. 9 is a diagram illustrating an example of virtual server management information.

FIG. 9 is a diagram illustrating a configuration of virtual server management information 54.

The virtual server management information 54 is a table for managing information such as the number of process included in the virtual server ID and the virtual server 7. The virtual server management information 54 records the configuration information 55, the statistics information 56 and the mobility management information 57.

Figure 10:
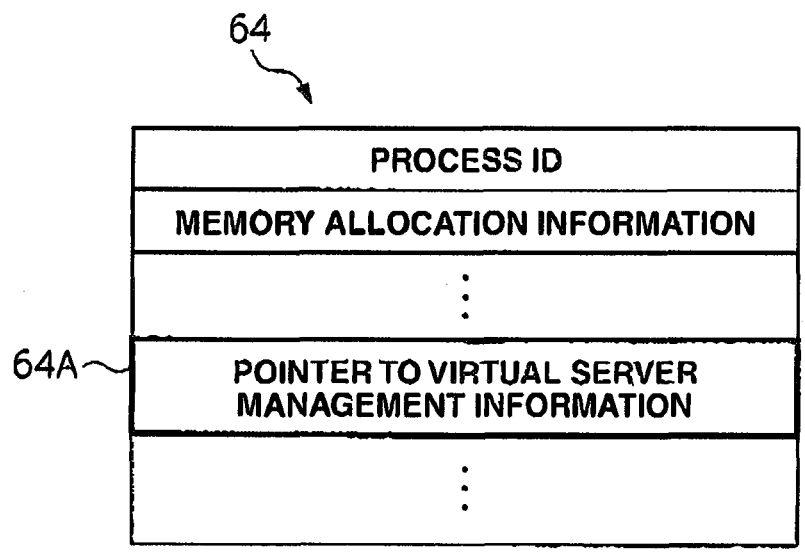
FIG. 10 is a diagram illustrating an example of process management information.

FIG. 10 is a diagram illustrating a configuration of process management information 64.

The process management information 64 is a table for managing process such as the NFS server 51 and the CIFS server 52, which are operated in the file sharing server 5. The process management information 64 is information for making an access to the virtual server management information 54. The process management information 64 records a pointer 64A to the virtual server management information 54. Thereby, the process management information 64 can establish one-to-one corresponding relation between the process and the virtual server management information 54.

FIG. 11 is a diagram illustrating virtual server I/O amount configuration information 30 of the management information 29 recorded in the storage 28 connected to the management terminal 4.

The virtual server I/O amount configuration information 30 is a table retaining the file server ID 30A, the virtual server ID 30B, the READ amount 30C and the WRITE amount 30D to establish a corresponding relation. The record of the virtual server I/O amount configuration information 30 specifies that the file server ID 30A includes the virtual server 7 with the virtual server ID 30B and that the virtual server 7 can makes an I/O access to the READ amount 30C and the WRITE amount 30D.

FIG. 12 is a diagram illustrating the file I/O amount configuration information 31 of the management information 29 recorded in the storage 28 connected to the management terminal 4.

The file I/O amount configuration information 31 is a table retaining the file server ID 31A, the virtual server ID 31B, the file path 31C, the READ amount 31D and the WRITE amount 31E to establish a corresponding relation. The record of the file I/O amount configuration information 31 specifies that the file server ID 31A includes the virtual server 7 with the virtual server ID 31B and that the file path 31C stored in the virtual server 7 can makes an I/O access to the READ amount 31D and the WRITE amount 31E. In addition, the file I/O amount configuration information 31 specifies that, in the case where "others" is configured in the file path 31C, all the files 12 not described in the relevant file I/O amount configuration information 31 fall therein.

Figure 13:
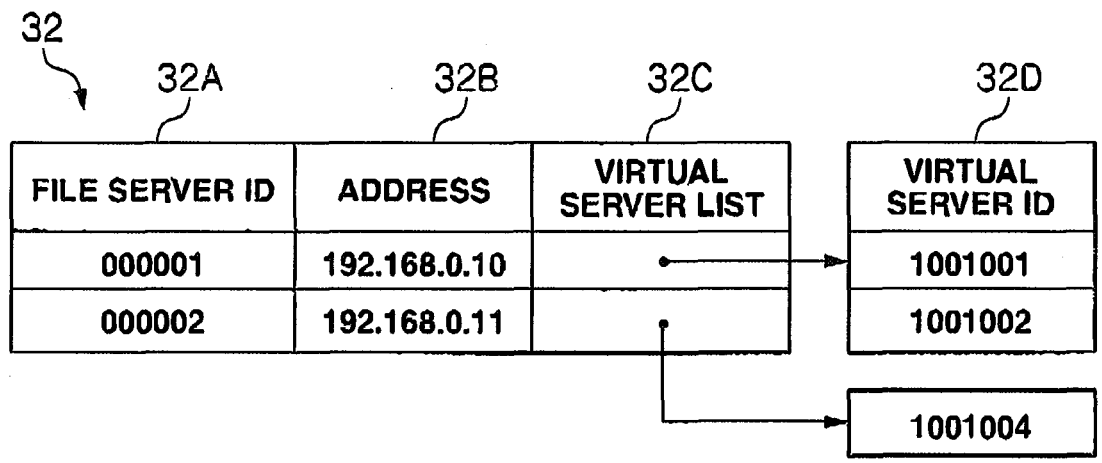
FIG. 13 is a diagram illustrating an example of virtual server management information.

The file I/O configuration information 31 specifies that the file I/O including the amount of reading and writing specified with the READ amount 31D and the WRITE amount 31E as the upper limit is allowed on the file 12 specified with the file server ID 31A, the virtual server ID 31B and the file path 31C FIG. 13 is a diagram illustrating virtual server management information 32 of the management information 29 recorded in the storage 28 connected to the management terminal 4.

The virtual server management information 32 is a table retaining the file server ID 32A, the address 32B, the virtual server list 32C and the list of the virtual server ID 32D to establish a corresponding relation. An address of the address 32B is configured in the file sharing server 5 with the file server ID 32A. Moreover, the virtual server 7 operated by the file sharing server 5 is recorded in the virtual server ID 32D.

Information in FIG. 11, FIG. 12 and FIG. 13 is information for retaining information configured by an administrator and is information for configuring the similar information again even after the file sharing system 1 starts up and halts. In particular, the virtual server management information 32 in FIG. 13 is information for specifying the file sharing server 5 and the virtual server 7 and is information indispensable for configuring an N-WAY cluster.

Figure 14:
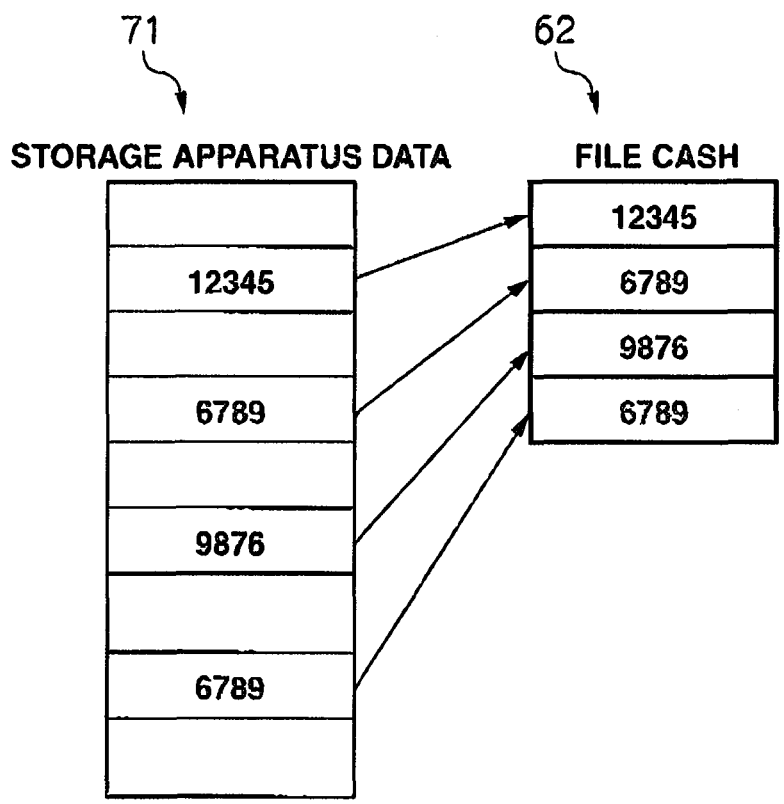
FIG. 14 is a diagram illustrating an example of a file cache.

FIG. 14 is a diagram illustrating a configuration of file cache 62 stored in the memory 43 of the file sharing server 5.

The file cache 62 is data obtained by lumping data in the storage 71 of the storage 8 together by a certain size to be stored on the memory 43. The data in the storage 71 saves the file 12 in a disorganized manner and stores the file 12 in a lump in the file cache 62.

Figure 15:
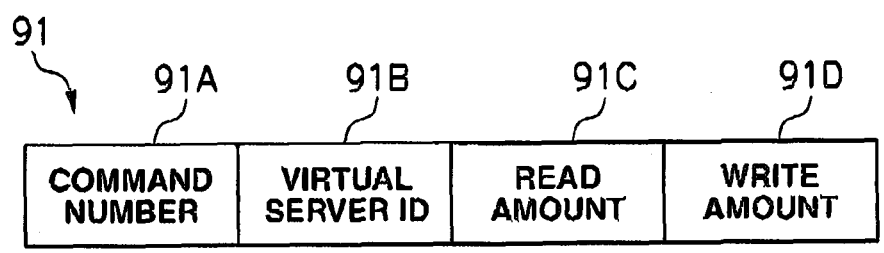
FIG. 15 is a diagram illustrating an example of a virtual server I/O amount configuration command.

FIG. 15 is a diagram illustrating a virtual server I/O amount configuration command 91 exchanged among the management program 25, the virtual server manager 60 and the file I/O flow controller 53 at the occasion where an administrator uses the management program 25 to input data of the configuration information 55.

The virtual server I/O amount configuration command 91 is configured by a command number 91A, the virtual server ID 91B, the READ amount 91C and the WRITE amount 91D. The command number 91A is a number to be distinguished from the other commands and "100", for example, is input. The virtual server ID 91B specifies an ID of the virtual server 7 to become an object for 110 amount control. The READ amount 91C and the WRITE amount 91D specify the reading and writing amount permitted to the virtual server ID 91B.

Figure 16:
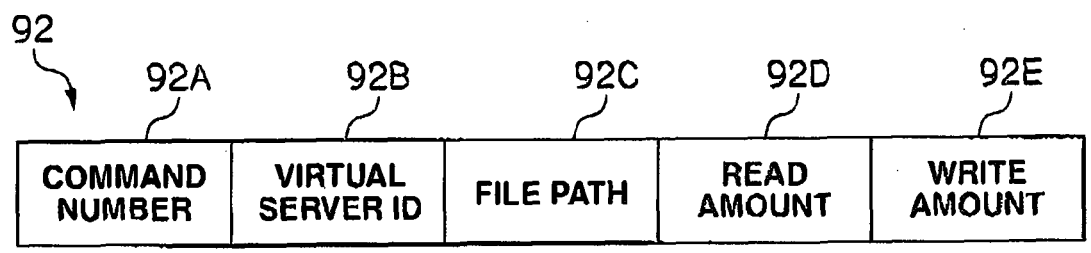
FIG. 16 is a diagram illustrating an example of a file I/O amount configuration command.

FIG. 16 is a diagram illustrating a file I/O amount configuration command 92 exchanged among the management program 25, the virtual server manager 60 and the file I/O flow controller 53 at the occasion where an administrator uses the management program 25 to input data of the configuration information 55.

The file I/O amount configuration command 92 is configured by a command number 92A, the virtual server ID 92B, the file path 92C, the READ amount 92D and the WRITE amount 92E. The command number 92A is a number to be distinguished from the other commands and "101", for example, is input. The virtual server ID 92B specifies an ID of the virtual server 7 retaining the file specified with the file path 92C. The READ amount 92C and the WRITE amount 92D specify the reading and writing amount permitted to the file 12 specified with the virtual server ID 92B and the file path 92C.

Figure 17:
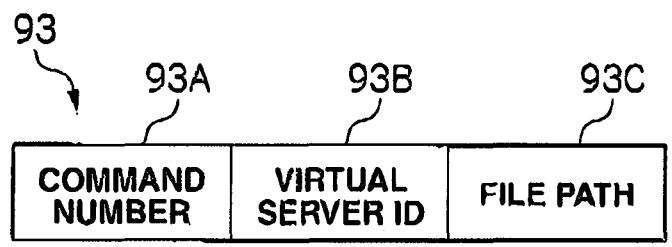
FIG. 17 is a diagram illustrating an example of a mobility management information configuration command.

FIG. 17 is a mobility management information configuration command 93 exchanged between the management program 25 and the virtual server manager 60 at the occasion where an administrator uses the management program 25 to configure the mobility management information 57.

Figure 18:
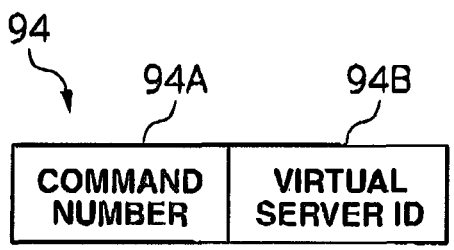
FIG. 18 is a diagram illustrating an example of a virtual server I/O amount acquisition request command.

The mobility management information configuration command 93 is configured by a command number 93A, the virtual server ID 93B and the file path 93C. The command number 93A is a number to be distinguished from the other commands. The virtual server ID 93B and the file path 93C are information for configuring a file 12 to allow no mobility at the occasion of determining mobility of the virtual server 7. By issuing the present command, a configuration request is made to the virtual server manager 60 of the file sharing server 5 and the mobility management information 57 is configured. The virtual server manager 60 uses the information thereof to configure the mobility management information 57, FIG. 18 is a diagram illustrating a virtual server I/O amount acquisition command 94 exchanged among the management program 25, the virtual server manager 60 and the file I/O flow controller 53 at the occasion where an administrator uses the management program 25 to acquire the statistics information 56.

The virtual server I/o amount acquisition command 94 is configured by the command number 92A and the virtual server ID 94B. The command number 94A is a number to be distinguished from the other commands and "102", for example, is input. On the other hand, the virtual server ID 94B specifies an ID of the virtual server 7 which an administrator desires to obtain the I/O amount.

Figure 19:
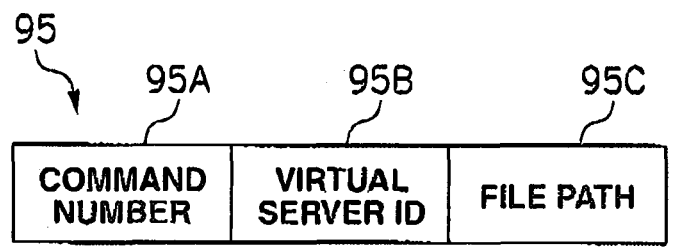
FIG. 19 is a diagram illustrating an example of a file I/O amount acquisition request command.

FIG. 19 is a diagram illustrating a file I/O amount acquisition request command 95 exchanged among the management program 25, the virtual server manager 60 and the file I/O flow controller 53 at the occasion where an administrator uses the management program 25 to acquire the statistics information 56.

The file I/O amount acquisition request command 95 is configured by a command number 95A, the virtual server ID 95B and the file path 95C. The command number 95A is a number to be distinguished from the other commands and "103", for example, is input. In addition, the virtual server ID 95B is an ID of the virtual server 7 retaining the file 12 specified with the file path 95C. The file path 95C is a path of the file 12 retained by the virtual server 7 specified with the virtual server ID 95B.

Figure 20:
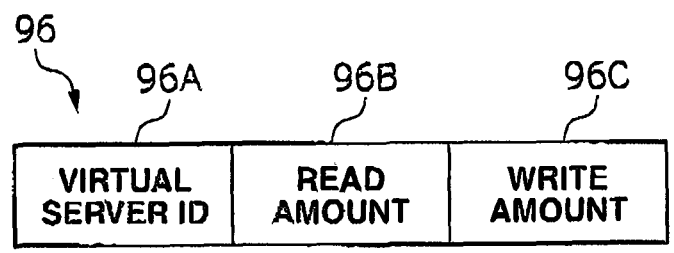
FIG. 20 is a diagram illustrating an example of a virtual server I/O amount acquisition request return value.

FIG. 20 is a diagram illustrating a virtual server I/O amount acquisition request return value 96 being a return value of the virtual server I/O amount acquisition request command 94.

The virtual server I/O amount acquisition request return value 96 is configured by the virtual server ID 96A, the READ amount 96B and the WRITE amount 96C. The virtual server ID 96A is an ID of the virtual server 7 requested with the virtual server I/O amount acquisition request command 94. The READ amount 96B and the WRITE amount 96C are the reading and writing amount of virtual server 7 specified with the virtual server ID 96A.

Figure 21:
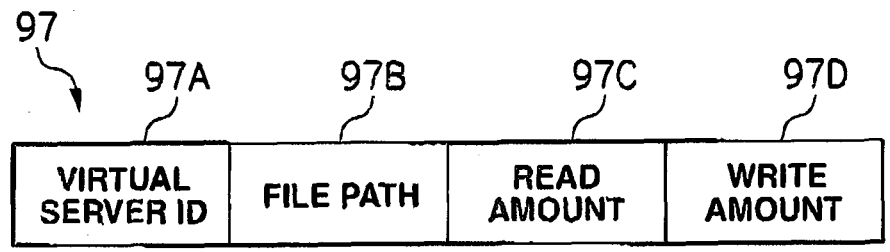
FIG. 21 is a diagram illustrating an example of file I/O amount acquisition request return value.

FIG. 21 is a diagram illustrating a file 110 amount acquisition request return value 97 being a return value of the file I/O amount acquisition request return command 95.

The file I/O amount acquisition request return value 97 is configured by the virtual server ID 97A, the file path 97B, the READ amount 97C and the WRITE amount 97D. The virtual server ID 97A is an ID of the virtual server 7 requested with the file I/O amount acquisition request command 95. The file path 97B is a file path requested with the file I/O amount acquisition request command 95. The READ amount 97C and the WRITE amount 97D are the reading and writing amount of the virtual server 7 specified with the virtual server ID 97A.

Figure 22:
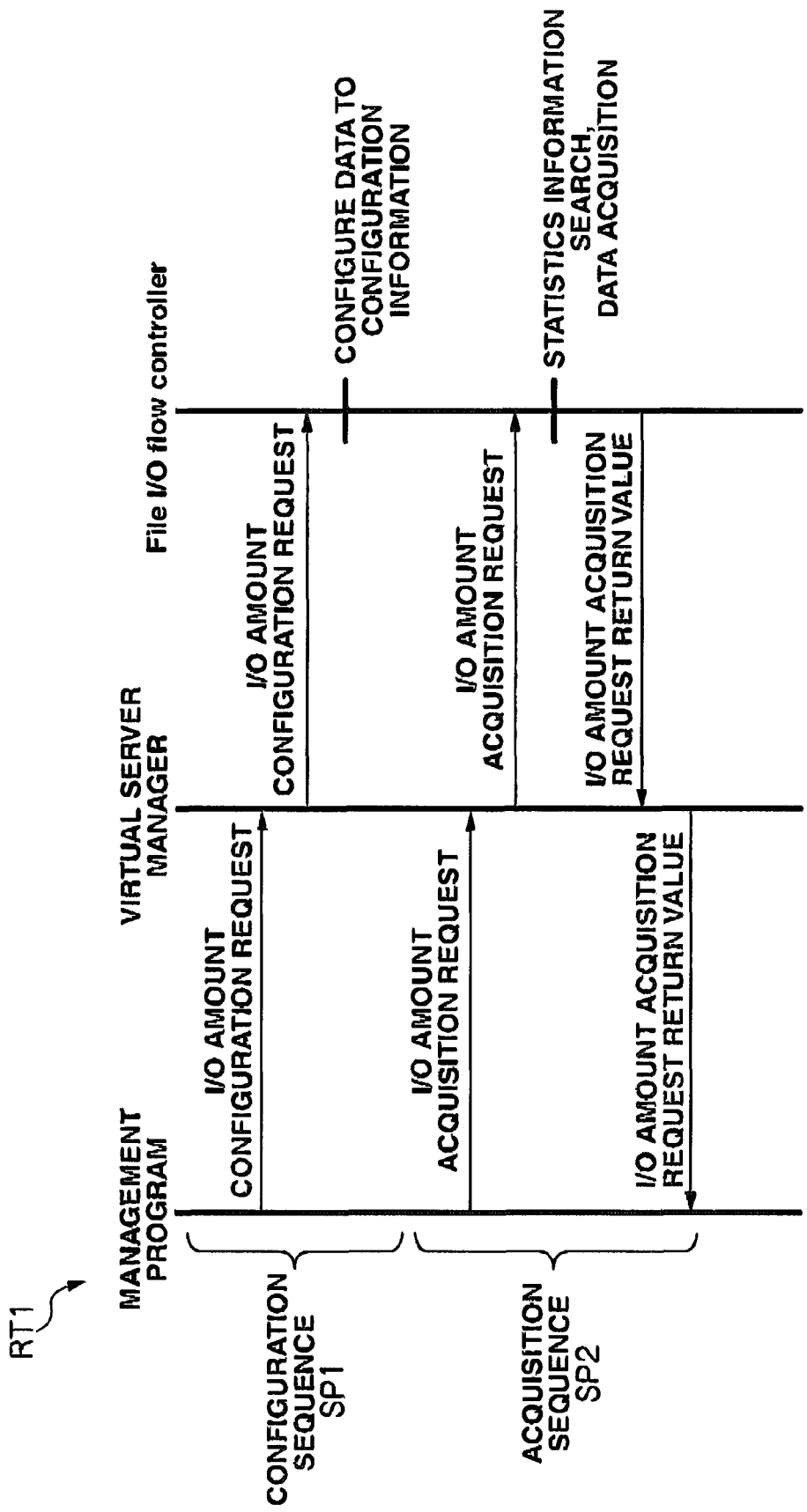
FIG. 22 is a diagram illustrating an example of access sequence to configuration information and statistics information.

FIG. 22 is a sequence flow RT 1 of the I/O amount configuration command and the I/O amount acquisition command described in FIG. 15 to FIG. 21.

The virtual server I/O amount configuration command 91 and the file I/O amount configuration command 92 will become flow of the configuration sequence SP 1 of the sequence flow RT 1. At first, the management program 25 transmits the I/O amount configuration request to the virtual server manager 60. The virtual server manager 60 transmits that request to the file I/O flow controller 53. The file I/O flow controller 53 configures information to the configuration information 55 according to the received request. On the other hand, the virtual server I/O amount acquisition request command 94 and the file I/O amount acquisition request command 95 will become flow of the acquisition sequence SP 2. At first, the management program 25 transmits the I/O amount acquisition request to the virtual server manager 60. The virtual server manager 60 transmits that request to the file I/O flow controller 53. The file I/O flow controller 53 obtains data of the statistics information 56. The file I/O flow controller 53 transmits the return value to the virtual server manager 60. The virtual server manager 60 transmits that return value to the management program 25.

Figure 23:
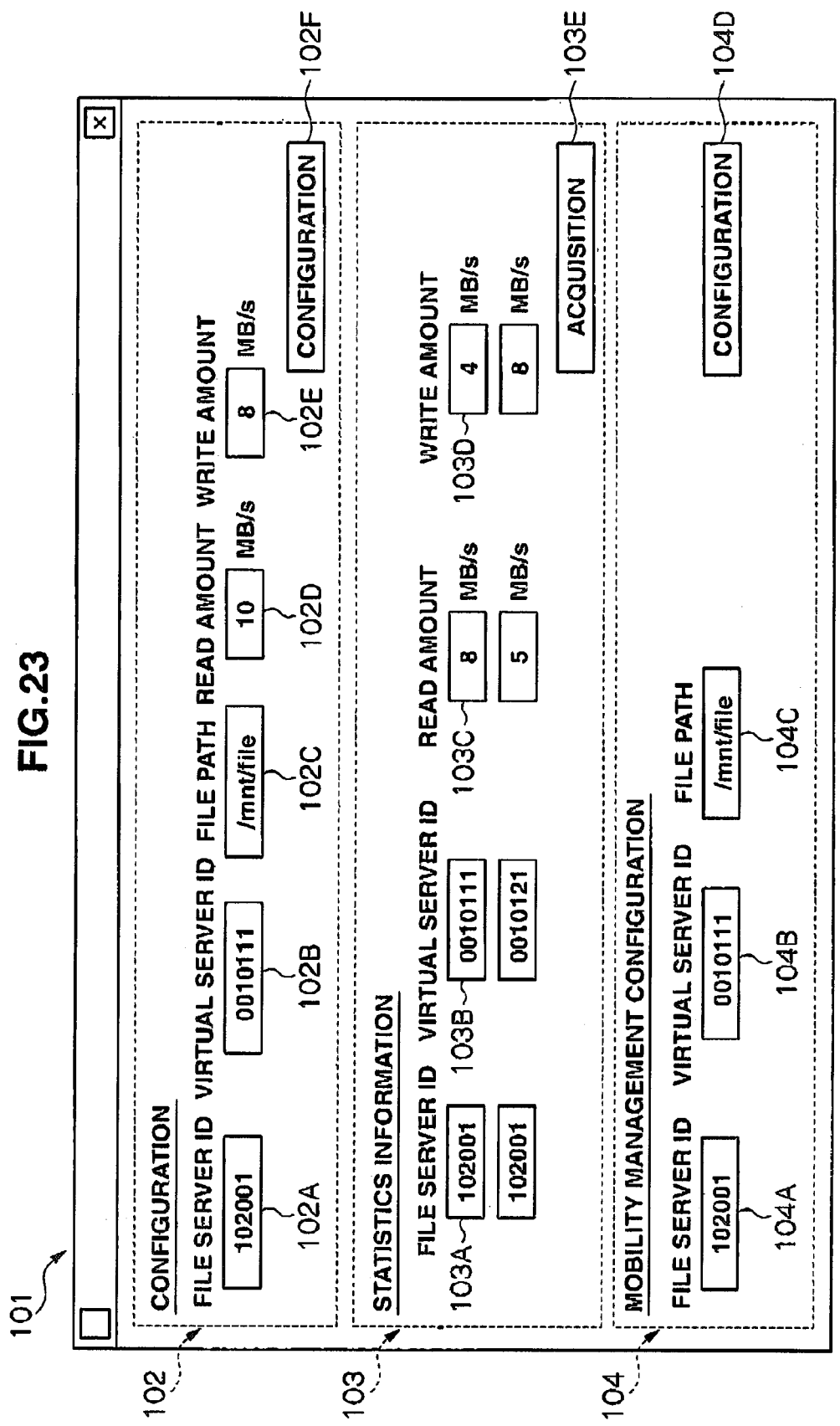
FIG. 23 is a diagram illustrating an example of user interface.

FIG. 23 is a diagram illustrating a user interface 101 displayed in a display part (not illustrated in the drawing) of the management terminal 4.

The user interface 101 is divided into the configuration 102, the statistics information 103 and the mobility management configuration 104. The configuration 102 includes an input boxes for inputting the file server ID 102A, the virtual server ID 102B, the file path 102C, the READ amount 102D and the WRITE amount 102E. Moreover, the configuration 101 includes a configuration button 102F for configuring the data that have been input. The data to be input to the respective input boxes are data configured to the above described virtual server I/O amount configuration command 91 and the file I/O amount configuration command 92. When an administrator pushes the configuration button 102F, the management program 25 transmits data together with the configuration command to the virtual server manager 60.

In addition, the statistics information 103 includes boxes displaying the file server ID 103A, the virtual server ID 103B8 the READ amount 103C and the WRITE amount 103D. Moreover, the statistics information 103 includes the acquisition button 103E for obtaining the statistics information. When an administrator pushes the acquisition button 103E, the management program 25 transmits acquisition command-to the virtual server manager 60.

In addition, the mobility management configuration 104 includes boxes for configuring the file server ID 104A, the virtual server ID 104B and the file path 104C. Moreover, the mobility management configuration 104 includes a configuration button 104D for transmitting the information thereof. When an administrator inputs the file server ID 104A, the virtual server ID 104B and the file path 104C and pushes the configuration button 104D, the management program 25 transmits the mobility management configuration command to the virtual server manager 60.

Figure 24:
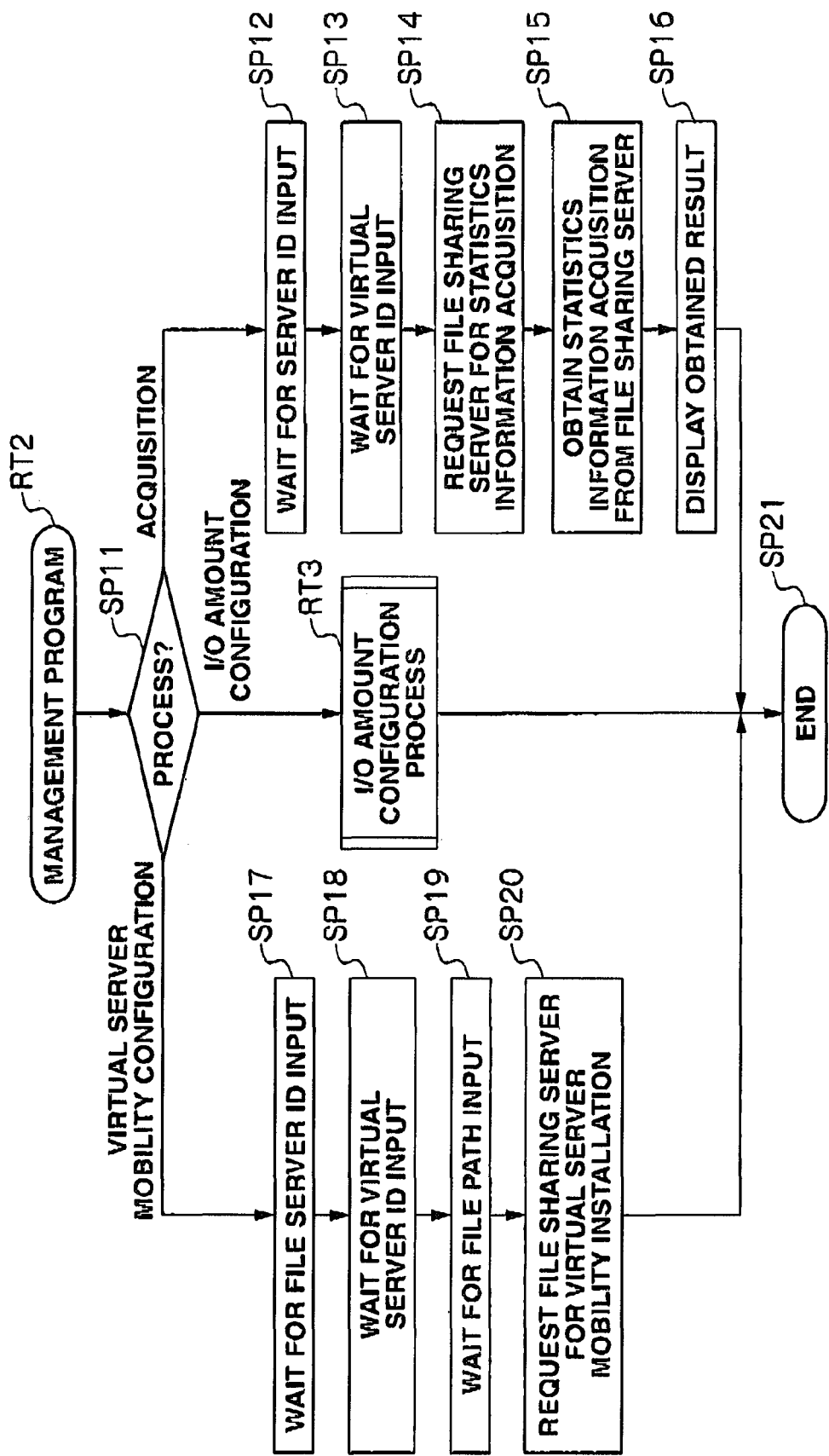
FIG. 24 is a diagram illustrating an example of process of a management program.

FIG. 24 is a flow chart specifying the process flow RT 2 of the management program 25 of the management terminal 4.

In the management program 25, at first, a process of a user determines the configuration information 55 (a step SP 11).

In the case of the I/O amount configuration process (a step SP 11: configuration), the management program 25 calls up the I/O amount configuration process (flow RT 3). On the other hand, in the case of acquisition process in the step SP 11 (a step SP 11: acquisition), the management program 25 accepts inputs of the server ID 103A and the virtual server ID 103B of the file sharing server 5 to become a statistics information acquisition object (a step SP12 and a step SP 13).

And, the management program 25 specifies a statistics information acquisition object based on the server ID 103A of the file sharing server 5 and transmits the virtual server I/O amount acquisition command 94 and the file I/O amount acquisition request command 95 to the file sharing server 5 (a step SP 14). The management program 25 receives the virtual server I/O amount acquisition request return value 96 and the file I/O amount acquisition request return value 97 from the file sharing server 5 (a step SP 15) and displays the acquisition result on the user interface 101 (a step SP 16) to finish the process (a step SP 21).

On the other hand, in the case of virtual server mobility configuration process (a step SP 11; mobility configuration), the management program 25 waits for an input of the file server ID 104A (a step SP 17), waits for an input of the virtual server ID 104B (a step SP 18), waits for an input of the file path 104C (a step SP 19) and lastly transmits the virtual server mobility configuration request to the file sharing server 5 with the mobility management information configuration command 93 (a step SP 20) to finish the process (a step SP 21). Thereby, in the file sharing server 5, the virtual server manager 60 is called up so that the mobility management information 57 is configured.

Figure 25:
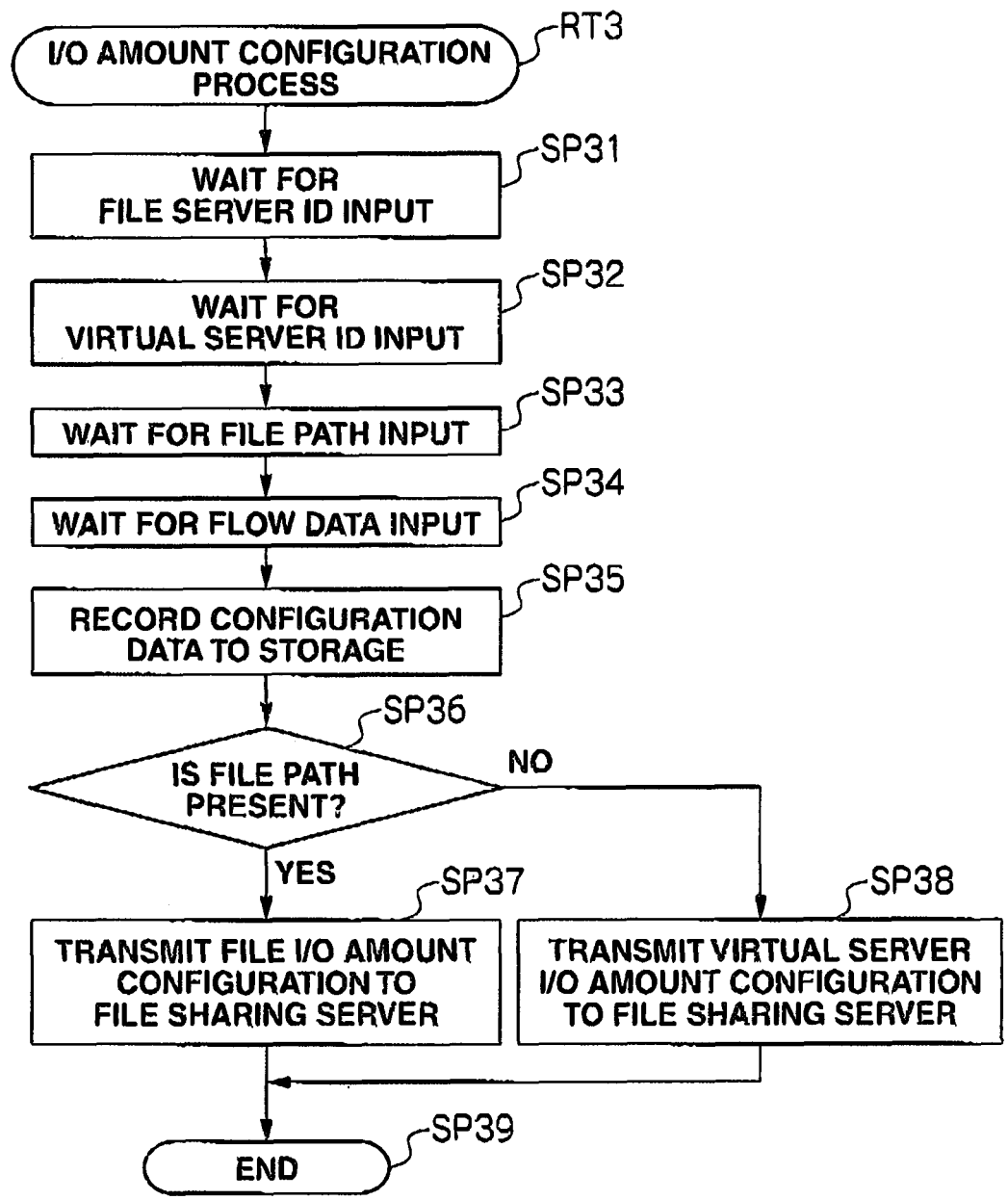
FIG. 25 is a diagram illustrating an example of I/O amount configuration process of process of a management program.

FIG. 25 is a flow chart illustrating process flow RT 3 of the I/O amount configuration process, which the management program 25 of the management terminal 4 calls up at the occasion of configuring the I/O amount.

In the I/O amount configuration process, the management program 25 waits for an input of the file server ID 102A (a step SP 31), waits for an input of the virtual server ID 102B (a step SP 32), waits for an input of the file path 102C (a step SP 33) and waits for an input of the flow data (READ amount 102D and WRITE amount 102E) (step SP 34). At that time, in the step 33 for waiting for the file path, there is the case where nothing is input. In the case where nothing is input, the management program 25 determines that the virtual server I/O amount configuration has been selected. That process is carried out in the step SP 36.

The management program 25 records those pieces of information to the management information 29 of the storage 28 (a step SP 35). Next, the management program 25 determines whether the file path 102C has been input in the step SP 33 (a step SP 36). In the case where the file path 102C is input (a step SP 36: YES), the configuration information is transmitted to the file sharing server 5 with the file I/O amount configuration command 92 (step SP 37). In addition, in the case where the file path is not input (step SP36: No), the configuration information is transmitted to the file sharing server 5 with the virtual server I/O amount configuration command 91 (a step SP 38) to finish the process (a step SP 39).

Figure 26:
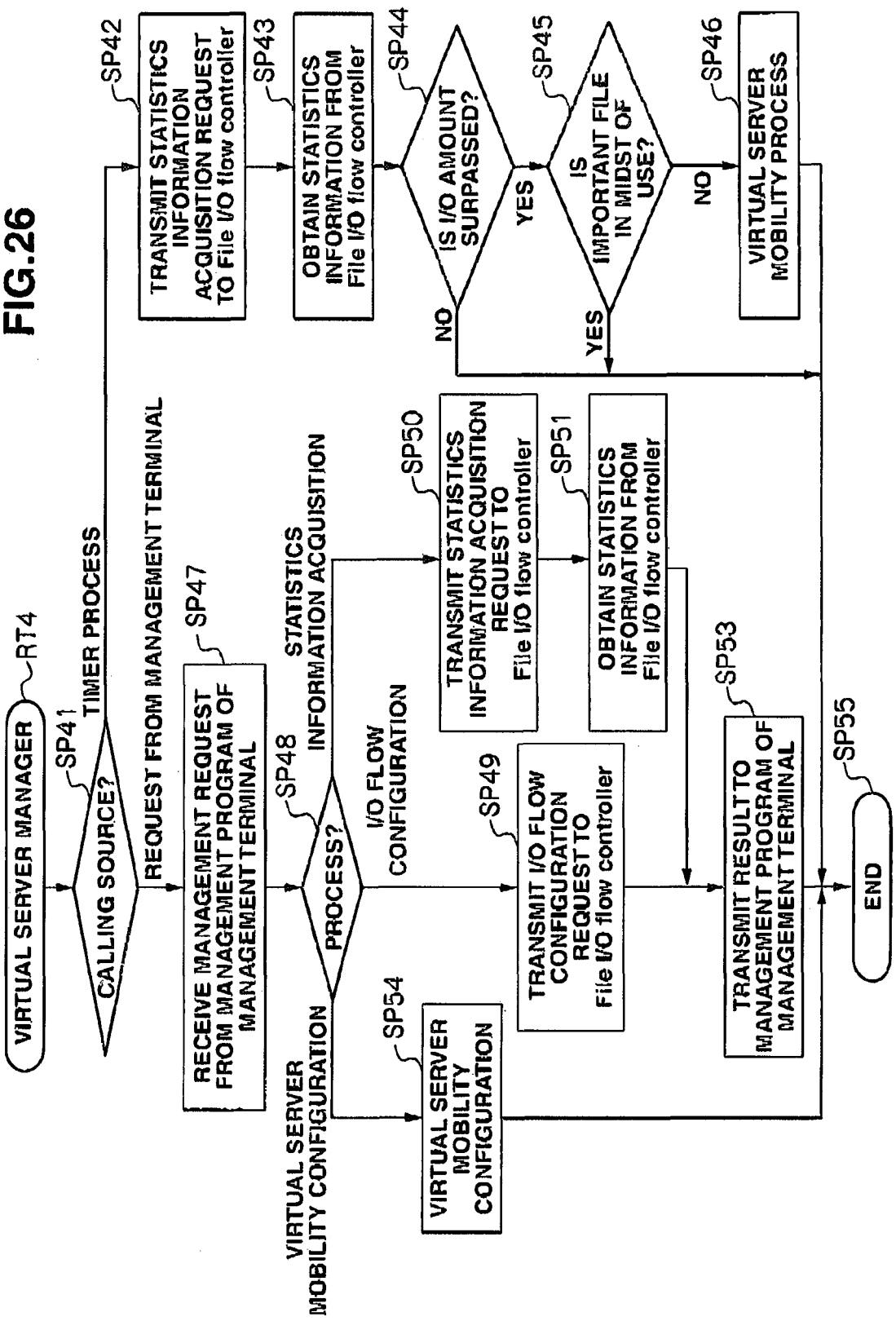
FIG. 26 is a diagram illustrating an example of process of a virtual server manager.

FIG. 26 is a flow chart illustrating process flow RT 4 of the virtual server manager 60 operated by the file sharing server 5.

The virtual server manager 60 determines whether the drive source (calling source) has received a timer call or a request (step SP 41). A timer call refers to a function of calling up a program in a constant time interval by utilizing a clock function which a computer comprises. With a timer call, process can be carried out every constant time period.

In the case of a timer call (a step SP 41; timer call), the virtual server manager 60 requests the file I/O flow controller 53 for statistics information acquisition (step SP 42). The virtual server manager 60 obtains the statistics information 56 from the file I/O flow controller 53 (a step SP 43). The virtual server manager 60 brings the virtual server I/O flow table 81, the file 110 flow table 82, the virtual server I/O statistics information 83 and the file I/O statistics information 84 respectively into comparison (a step SP 44). In the case where the virtual server I/O statistics information 83 and the file I/O statistics information 84 configured as tolerance surpasses the tolerance of the virtual server I/O flow table 81 and the file I/O flow table 82, the virtual server manager 60 determines such a case as I/O amount excess. Here, for a lot of cases, the I/O flow control to be described later allows expectation that no excess occurs. However, in the case where a lot of reading and writing are carried out for too many files 12, the capacity of the I/O flow control can be surpassed. In that case, the virtual server manager 60 determines the case as I/O amount excess in the step SP 44.

In the case of determination as I/O amount excess (a step SP 44: YES), the virtual server manager 60 determines with the mobility management information 57 whether an important file out of the virtual server ID 57A and the file path 57B is utilized by the virtual server 7 (a step SP 45). IQ the case of reading and writing a file recorded in the mobility management information 57, the virtual server manager 60 determines that an important file is being used. In the case where no important file is utilized (a step SP 45: NO), the virtual server manager 60 moves the virtual server 7 (a step SP 46). On the other hand, in the case of no file is utilized (a step SP 45: YES), the virtual server manager 60 does not move the virtual server 7.

In addition, in the case where no I/O amount is surpassed (a step SP 44: NO), the process is finished (a step SP 55).

The above description will be a procedure of process in which the virtual server 7 is moved (or not moved), which is overloaded, by investigating the load status of the virtual server 7 by the virtual server manager 60 in every predetermined time period.

On the other hand, in receipt of a request from the management program 25 of the management terminal 4 (a step SP 41: process request reception, a step SP 47), the virtual server manager 60 determines which of the I/O flow configuration, the statistics information acquisition and the virtual server mobility configuration process the request process is for (a step SP 48).

In the case where the request process is I/O flow configuration (a step SP 48: I/O flow configuration), the virtual server manager 60 makes an I/O amount configuration request to the file I/O flow controller 53 (a step SP 49). That I/O amount configuration request includes a virtual server I/O amount configuration command 91 and a file I/O amount configuration command 92.

On the other hand, in the case where the request process is the statistics information acquisition (a step SP 48; statistics information acquisition), the virtual server manager 60 transmits the statistics information acquisition request to the file I/O flow controller 53 (a step SP 50). That statistics information acquisition request includes a virtual server I/O amount acquisition request command 94 and a file I/O amount acquisition request command 95. The virtual server manager 60 receives statistics information 56 from the file I/O flow controller 53 (a step SP 51). The information for receiving that statistics information 56 includes a virtual server I/O amount acquisition request return value 96 and a file I/O amount acquisition request return value 97.

Lastly, the virtual server manager 60 transmits a result to the management program 25 of the management terminal 4 (a step SP 52) to finish the process (a step SP 55).

On the other hand, in the case of the virtual server mobility configuration process in the step SP 48, the virtual server manager 60 carries out virtual server mobility configuration (a step SP 54). Specifically, the virtual server manager 60 receives a mobility management information configuration command 93 from the management program 25 of the management terminal 4 and makes a configuration to the virtual server ID 57A and the file path 57B of the mobility management information 57 based on the virtual server ID 93B and the file path 93C specified therein. That mobility management information 57 is used in the step SP 44 of the process of the virtual server manager 60.

Figure 27:
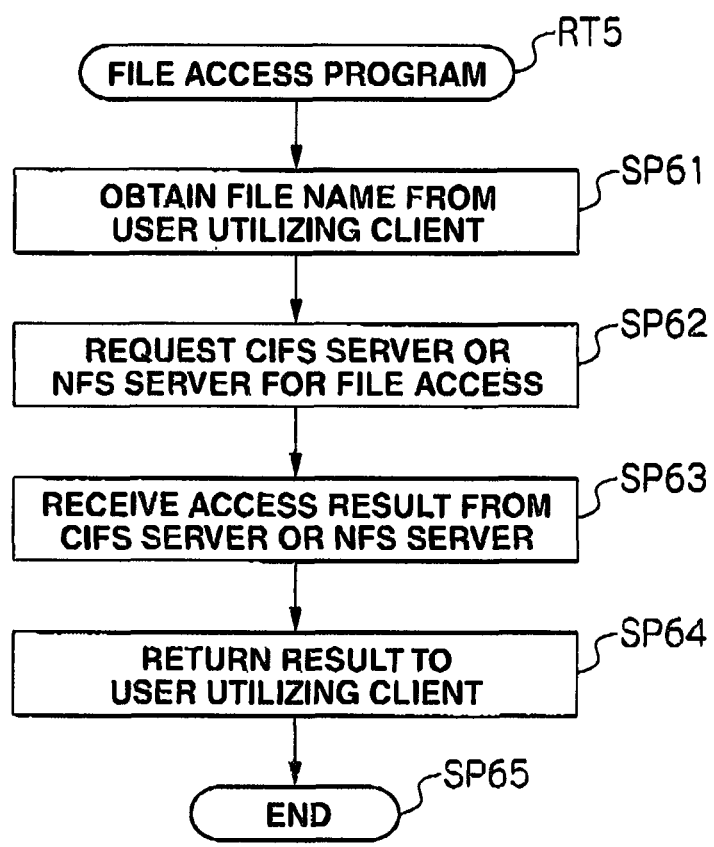
FIG. 27 is a diagram illustrating an example of process of a file access program.

FIG. 27 is a flow chart illustrating process flow RT 5 of the file access program 3 of the client apparatus 2.

The file access program 3 receives a file access request from a user who utilizes the client apparatus 2 to obtain a file name of that file 12 (a step SP 61). The file access program 3 transmits the file access request to the CIFS server 52 or the NFS server 51 (a step SP 62). The file access program 3 then receives a file access result from the CIFS server 52 or the NFS server 51 (a step SP 63). Lastly, the file access program 3 returns the access result to the user (a step SP 64) to finish the process (a step SP 65).

Figure 28:
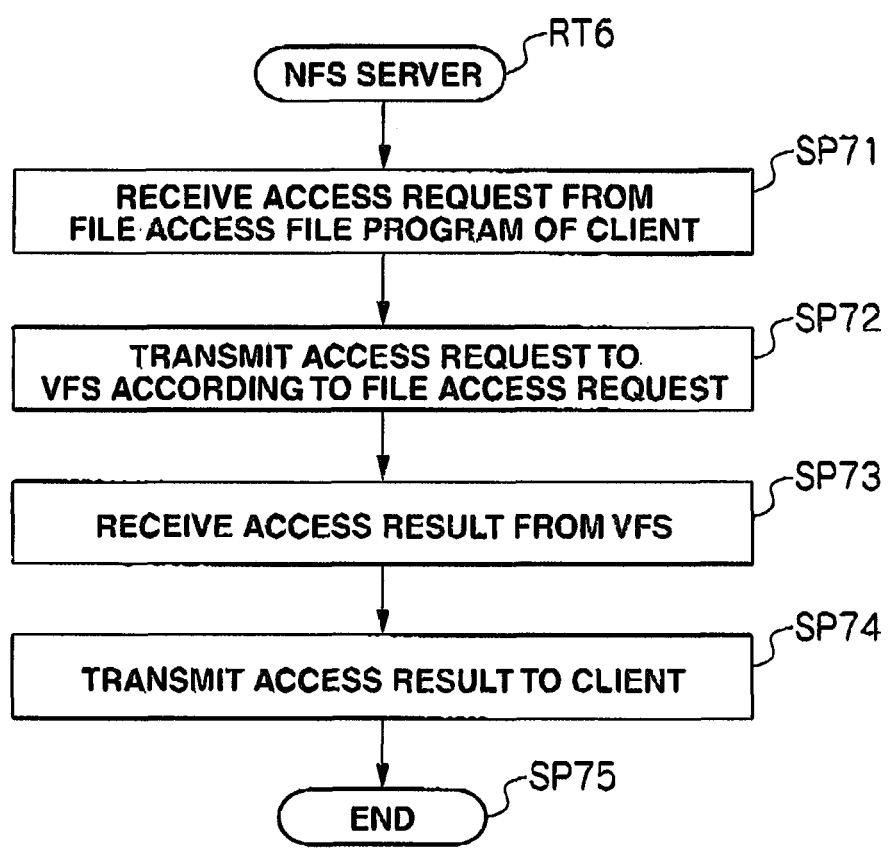
FIG. 28 is a diagram illustrating an example of process of an NFS server.

FIG. 28 is a flow chart illustrating process flow RT 6 of the NFS server 51 of the file sharing server 5.

The NFS server 51 receives a file access request from the file access program 3 of the client apparatus 2 (a step SP 71). The NFS server 51 then transmits the file access request to the VFS 63 according to that file access request (step SP 72) and receives a file access result from the VFS 63 (a step SP 73). ) Lastly, the NFS server 51 returns the file access result to the client apparatus 2 (a step SP 74) to finish the process (a step SP 75).

Figure 29:
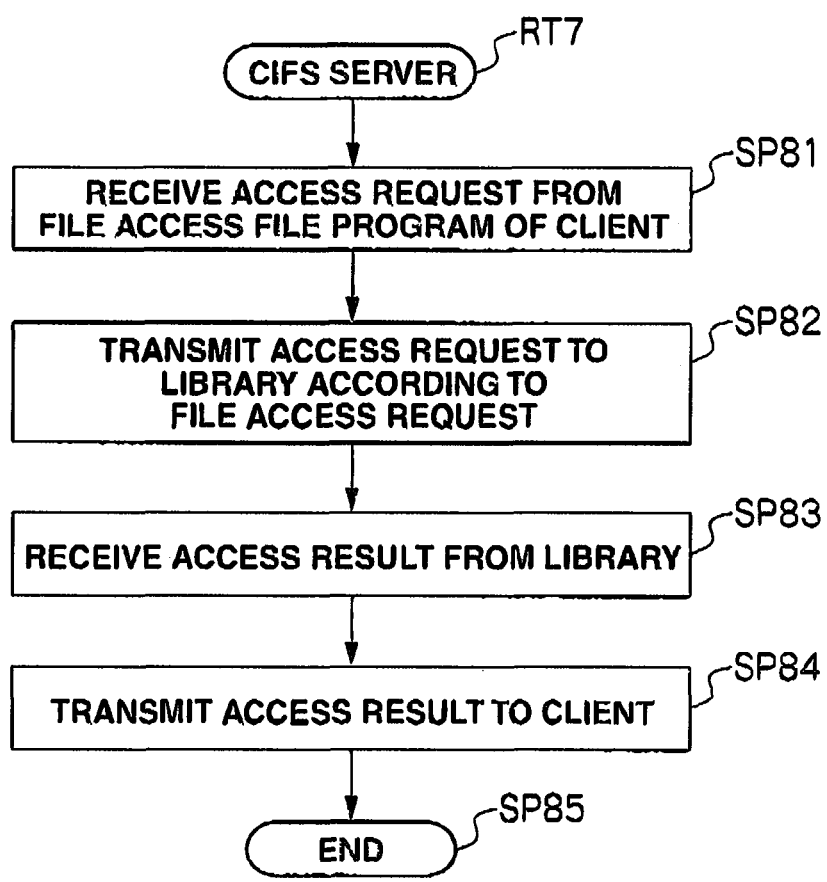
FIG. 29 is a diagram illustrating an example of process of a CJFS server.

FIG. 29 is a flow chart illustrating process flow RT 7 of the CIFS server 52 of the file sharing server 5.

The CIFS server 52 receives a file access request from the file access program 3 of the client apparatus 2 (a step SP 81). The CIFS server 52 transmits the file access request to the library 61 according to that file access request (a step SP 82) and receives a file access result from the library 61 (a step SP 83). Lastly, the CIFS server 52 returns a file access result to the client apparatus 2 (a step SP 84) to finish the process (a step SP 85).

Figure 30:
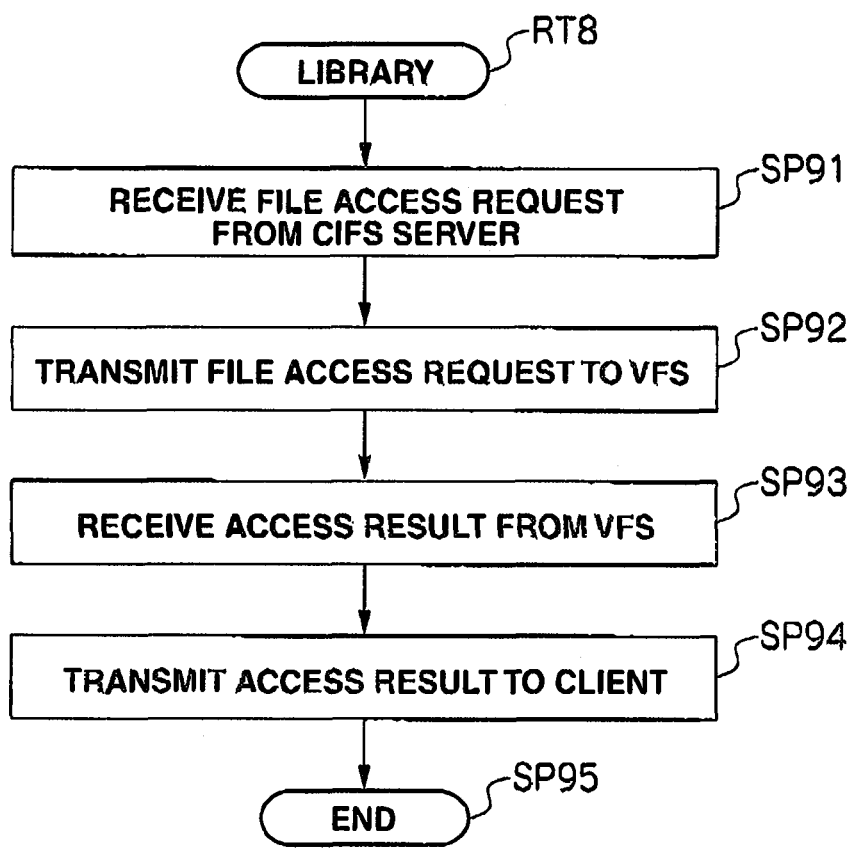
FIG. 30 is a diagram illustrating an example of process of a library.

FIG. 30 is a flow chart illustrating process flow RT 8 of the library 61 of the file sharing server 5.

The library 61 receives a file access request from the CIFS server 52 (a step SP 91). The library 61 transmits a file access request to the VFS 63 according to that file access request (a step SP 92) and receives a file access result from the VFS 63 (a step SP 93). Lastly, the library 61 returns the file access result to the CIFS server 52 (a step SP 94) to finish the process (a step SP 95).

Originally, the library 61 is not a program utilized only by the CIFS server 52 but a program which various programs share to utilize. Here, it is not utilized in a part of programs of the NFS server 51 and the like. Thus, the library 61 is not necessarily utilized.

Figure 31:
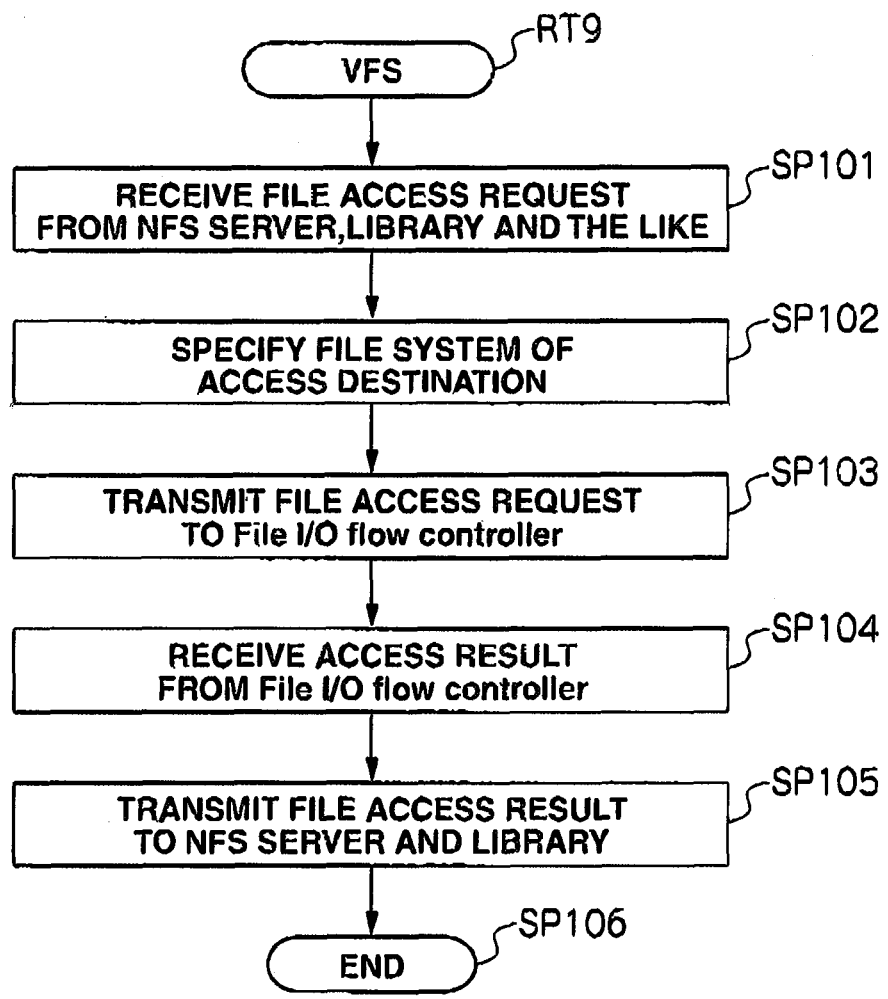
FIG. 31 is a diagram illustrating an example of process of VFS.

FIG. 31 is a flow chart illustrating process flow RT 9 of the VFS 63 of the file sharing server 5.

The VFS 63 provides the NFS server 51 and the library 61 with an access interface to the file 12. The VFS 63 receives the file access request from the NFS server 51 and the library 61 (a step SP 101). The VFS 63 specifies a file system of the destination of the access (a step SP 102). Normally, the file system stored in the storage 71 of the storage 8 includes a various kinds and intrinsic file access systems are packaged respectively. In order to carry out intrinsic access systems, each stored file system includes a local file system 58. The VFS 63 carries out that process in the step SP 102. According to that file access request, the VFS 63 transmits the file access request to the file I/O flow controller 53 (a step SP 103) and receives a file access result from the file I/O flow controller 53 (a step SP 104). Lastly, the VFS 63 returns a file access result to the NFS server 51 and the library 61 (a step SP 105) to finish the process (a step SP 106).

Figure 32:
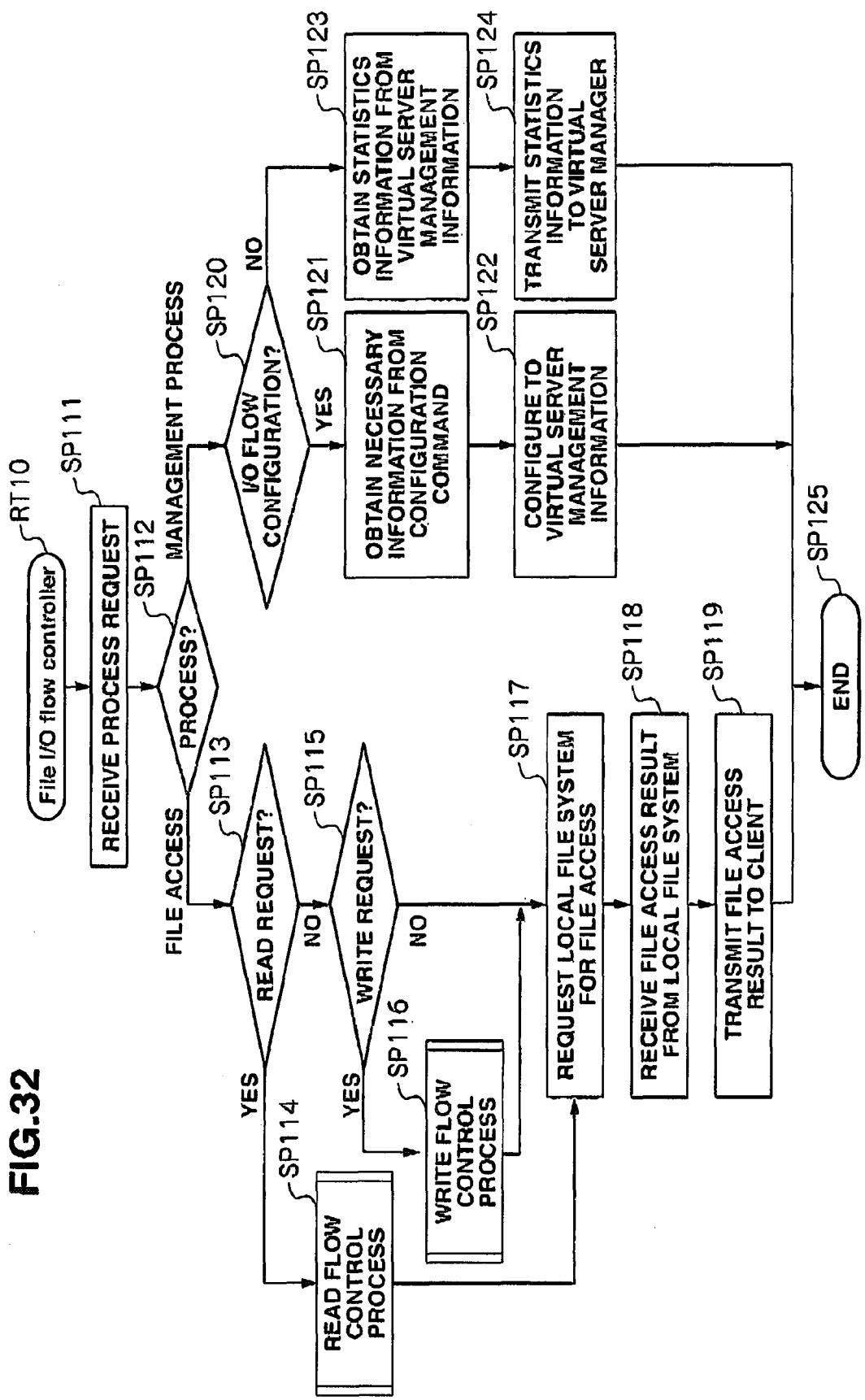
FIG. 32 is a diagram illustrating an example of process of a file I/O flow controller.

FIG. 32 is a flow chart illustrating main process flow RT 10 of the file I/O flow controller 53 of the file sharing server 5. 37

The file I/O flow controller 53 receives a process request from the VFS 63 and the virtual server manager 60 (a step SP 111) and determines whether the process is a file access or a management process (a step SP 112).

In the case of the file access (a step SP 112: file access), the file I/O flow controller 53 checks whether the file access is a READ (reading) request (a step SP 113).

In the case of the READ request (a step SP 113: YES), the file I/O flow controller 53 carries out a READ flow control process (a step SP 114) and requests the local file system 58 for a file access (a step SP 117). Lastly, the file I/O flow controller 53 receives a file access result from the local file system 58 (a step SP 118) and returns it to the request source (a step SP 119) to finish the process (a step SP 125).

On the other hand, not in the case of the READ request (a step SP 113: No), the file I/O flow controller 53 subsequently checks whether a WRITE (writing) is requested (a step SP 115). In the case of a writing request (a step SP 115: YES), the file I/O flow controller 53 carries out a WRITE flow control process (a step SP 116). Since process thereafter (a step SP 118 to a step SP 125) is similar to the READ process, description thereon will be omitted.

On the other hand, in the case where WRITE is not requested, either (a step SP 115. NO), the file I/O flow controller 53 does not do anything in particular but requests the local file system 58 for a file access (a step SP 117). Since the step SP 118 to the step SP 125 is similar to the READ process, description thereon will be omitted.

In addition, in the case where the step SP 112 is a management process (a step SP 112: management process), the file I/O flow controller 53 determines whether the management process is an I/O flow configuration process (a step SP 120). That determination can be carried out based on a command number of a command (virtual server I/O amount configuration command 91, a file 110 amount configuration command 92, a virtual server I/O amount acquisition request command 94 and a file I/O amount acquisition request command 95).

In the case where the management process is the I/O flow configuration (a step SP 120: YES), the file I/O flow controller 53 obtains virtual server ID, READ amount and the like from the configuration command (the virtual server I/O amount configuration command 91 and the file I/O amount configuration command 92) received from the virtual server manager 60 (a step SP 121). The file I/O flow controller 53 makes a configuration to the configuration information 55 of the virtual server management information 54 (a step SP 122) to finish the process (a step SP 125).

On the other hand, in the case where the management process is not the I/O flow configuration (a step SP 120: NO), the file I/O flow controller 53 obtains statistics information from the statistics information 56 of the virtual server management information 54 (a step SP 123). The file I/O flow controller 53 then returns to the virtual server manager 60 with that statistics information 56 (a step SP 124) to finish the process (a step SP 125).

Figure 33:
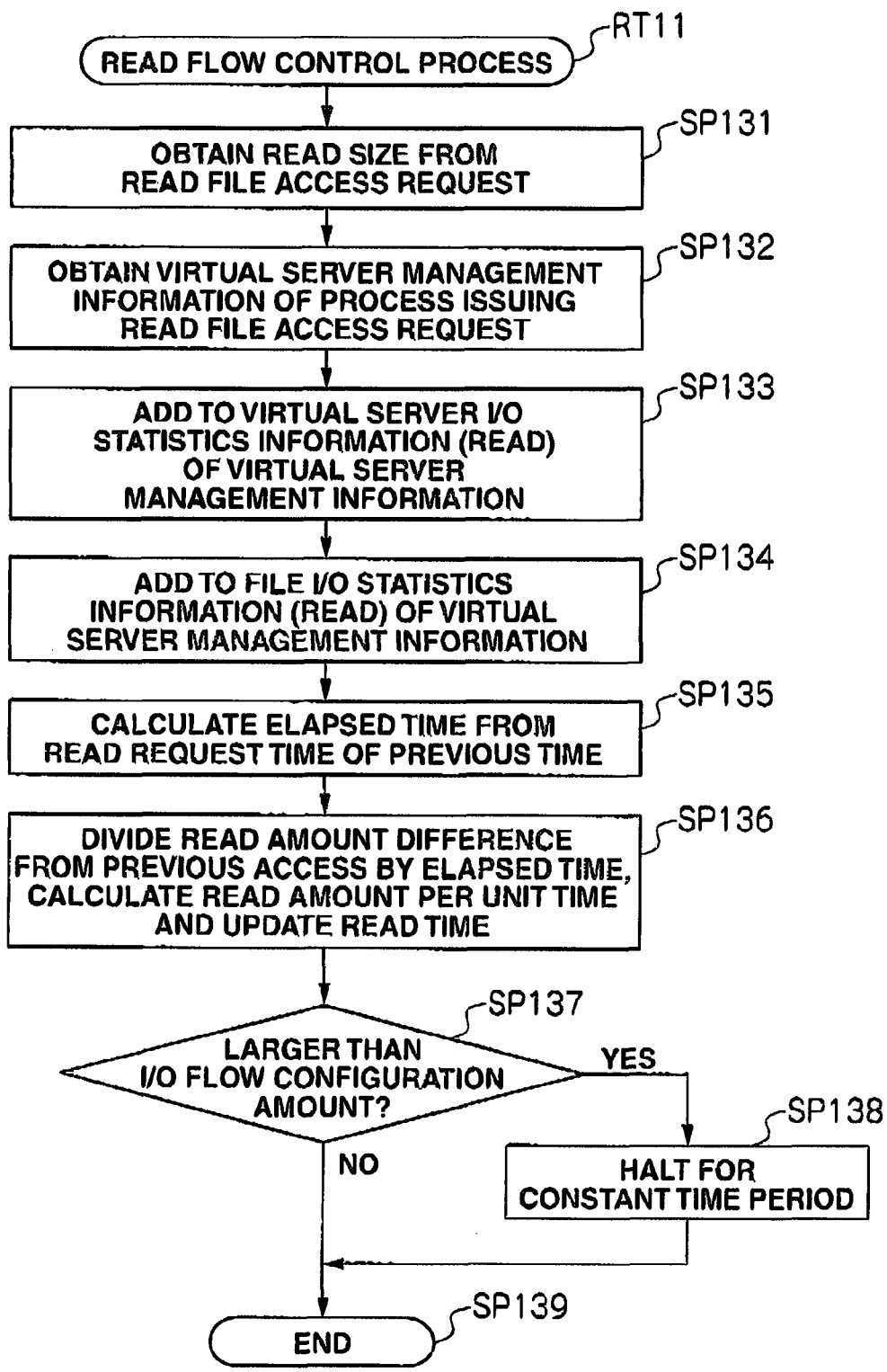
FIG. 33 is a diagram illustrating an example of READ process of a file I/O flow controller.

FIG. 33 is a flow chart illustrating READ process flow RT 11 of the file I/O flow controller 53 of the file sharing server 5.

The file I/O flow controller 53 obtains a file read size from the READ access request of the VFS 63 (a step SP 131). The file I/O flow controller 53 obtains process management information 64 of a process (such as CIFS server 52 and the NFS server 51) which has carried out the READ file access request from the information of the OS and obtains the virtual server management information 54 from that process management information 64 (a step SP 132). The file I/O flow controller 53 adds the read amount to the total READ amount 83C of the virtual server I/O statistics information 83 in the statistics information 56 of the virtual server management information 54 (a step SP 133). Moreover, the file I/O flow controller 53 adds the read amount to the total READ amount 84D of the file I/O statistics information 84 in the statistics information 56 of the virtual server management information 54 (a step SP 134).

In addition, the file I/O flow controller 53 obtains the READ time 84F of the previous time and divides the READ difference with the elapsed time to calculate the READ amount per unit time (a step SP 135). The READ amount 83A of the virtual server I/O statistics information 83 and the READ amount 84B of the file I/O statistics information 84 are updated to update the READ time 84F (a step SP 136). The file I/O flow controller 53 determines whether the READ amount per unit time is larger than the virtual server I/O flow table 81 or the file I/O flow table 82 (a step SP 137). In the case where the READ amount per unit time is larger (a step SP 137: YES), the file I/O flow controller 53 halts reading for a constant time period (such as one second) (a step SP 138) and continues the READ process flow to finish the process (a step SP 139). Here, the halt time can be changed arbitrarily. On the other hand, in the case where the READ amount per unit time is smaller (a step SP 137: NO), the READ process flow goes on as is to finish the process (a step SP 139).

Here, the file I/O flow controller 53 does not return to the step SP 137 after a halt for a constant time period. This is because in the case where the I/O flow is too large, the READ amount per unit time will become larger than the I/O flow configuration amount even after a halt for a constant time period so that file reading will halt for a long time period and, consequently, the file access program 3 of the client apparatus 2 occasionally determines that a reading error has occurred and such determination has to be avoided. The file I/O flow controller 53 returns the result a bit by a bit with a halt for a constant time period and, thereby, without allowing the file access program 3 to determine that a reading error has occurred to enable execution of I/O flow control further.

However, the excess load state occasionally lasts because of that process and, thereby, movement of the virtual server 7 occasionally occurs. In order to determine whether or not that movement of the virtual server 7 is possible, the virtual server manager 60 uses the mobility management information 57. The mobility process has already been described.

Figure 34:
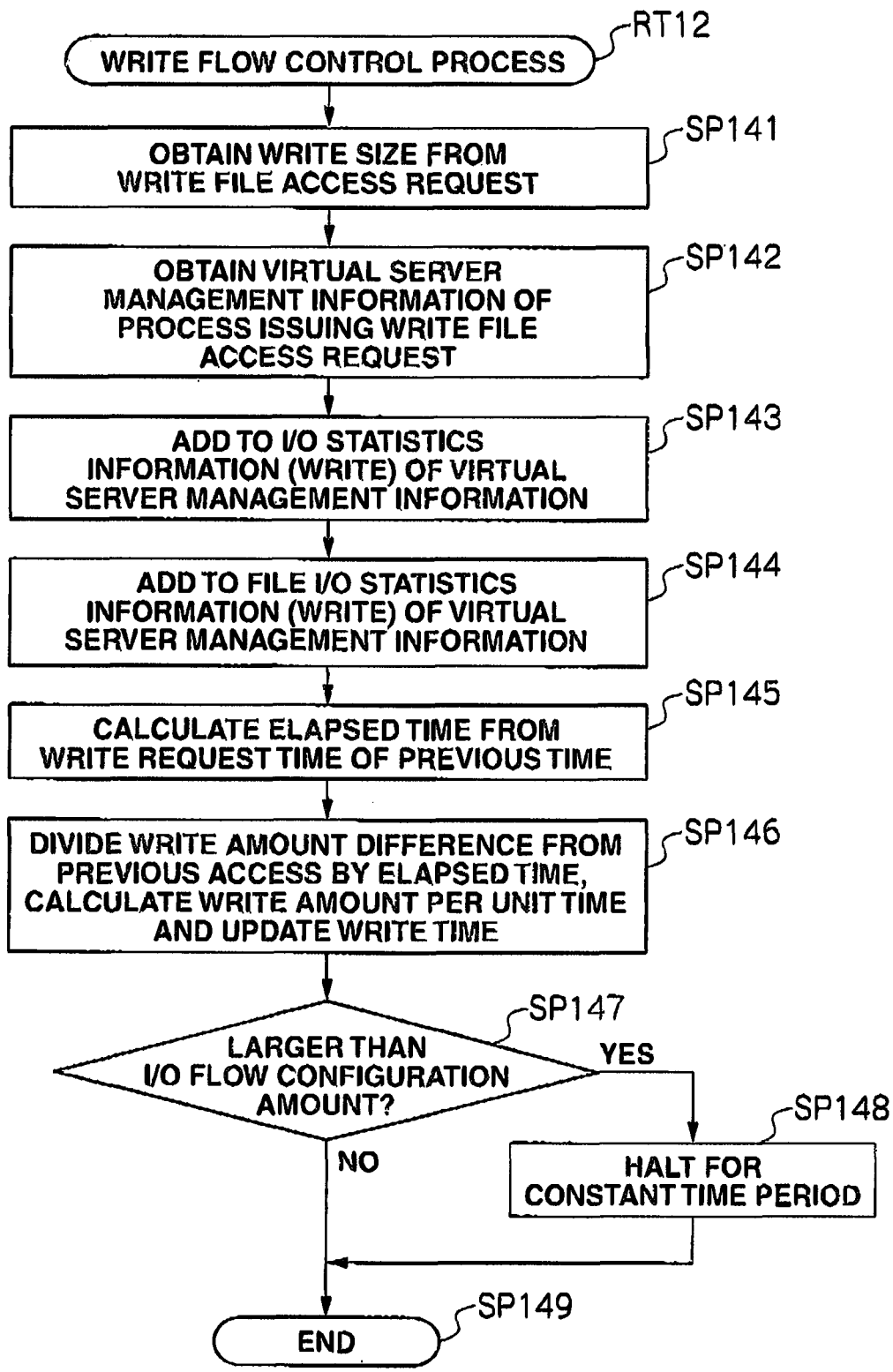
FIG. 34 is a diagram illustrating an example of WRITE process of a file I/O flow controller.

FIG. 34 is a flow chart illustrating WRITE process flow RT 12 of the file I/O flow controller 53 of the file sharing server 5.

The file I/O flow controller 53 obtains a file read size from the WRITE access request of the VFS 63 (a step SP 141). The file I/O flow controller 53 obtains process management information 64 of a process (such as CIFS server 52 and the NFS server 51) which has carried out the WRITE file access request from the information of the OS and obtains the virtual server management information 54 from that process management information 64 (a step SP 142). The file I/O flow controller 53 adds the write amount to the total WRITE amount 83D of the virtual server statistics information 83 in the statistics information 56 of the virtual server management information 54 (a step SP 143). Moreover, the file I/O flow controller 53 adds the write amount to the total WRITE amount 84E of the file I/O statistics information 84 in the statistics information 56 of the virtual server management information 54 (a step SP 144).

In addition, the file I/O flow controller 53 obtains the WRITE time 84G of the previous time and divides the WRITE difference with the elapsed time to calculate the WRITE amount per unit time (SP 145). The file I/O flow controller 53 updates the WRITE amount 83B of the virtual server I/O statistics information 83 and the WRITE amount 84C of the file I/O statistics information 84 to updates the WRITE time 84G (step SP 146). The file I/O flow controller 53 determines whether the WRITE amount per unit time is larger than the virtual server I/O flow table 81 or the file I/O flow table 82 (a step SP 147). In the case where the WRITE amount per unit time is larger (a step SP 147: YES), the file I/O flow controller 53 halts writing for a constant time period (such as one second) (a step SP 148) and continues the WRITE process flow to finish the process (a step SP 149). Here, the halt time can be changed arbitrarily. On the other hand, in the case where the WRITE amount per unit time is smaller (a step SP 147: NO), the WRITE process flow goes on to finish the process (a step SP 149). Here, the file I/O flow controller 53 does not return to the step SP 147 after a halt for a constant time period. In the case where the I/O flow is too large, the WRITE amount per unit time will enter the state being larger than the I/O flow configuration amount even after a halt for a constant time period so that file writing will halt for a long time period. Consequently, the reason thereof is that the file access program 3 of the client apparatus 2 occasionally determines that a writing error has occurred and such determination has to be avoided. The file I/O flow controller 53 returns the result a bit by a bit with a halt for a constant time period and, thereby, without allowing the file access program 3 to determine that a writing error has occurred to enable execution of I/O flow control further.

However, the excess load state occasionally lasts because of that process and, thereby, movement of the virtual server 7 occasionally occurs. In order to determine whether or not that movement of the virtual server 7 is possible, the virtual server manager 60 uses the mobility management information 57. The mobility process has already been described.

Figure 35:
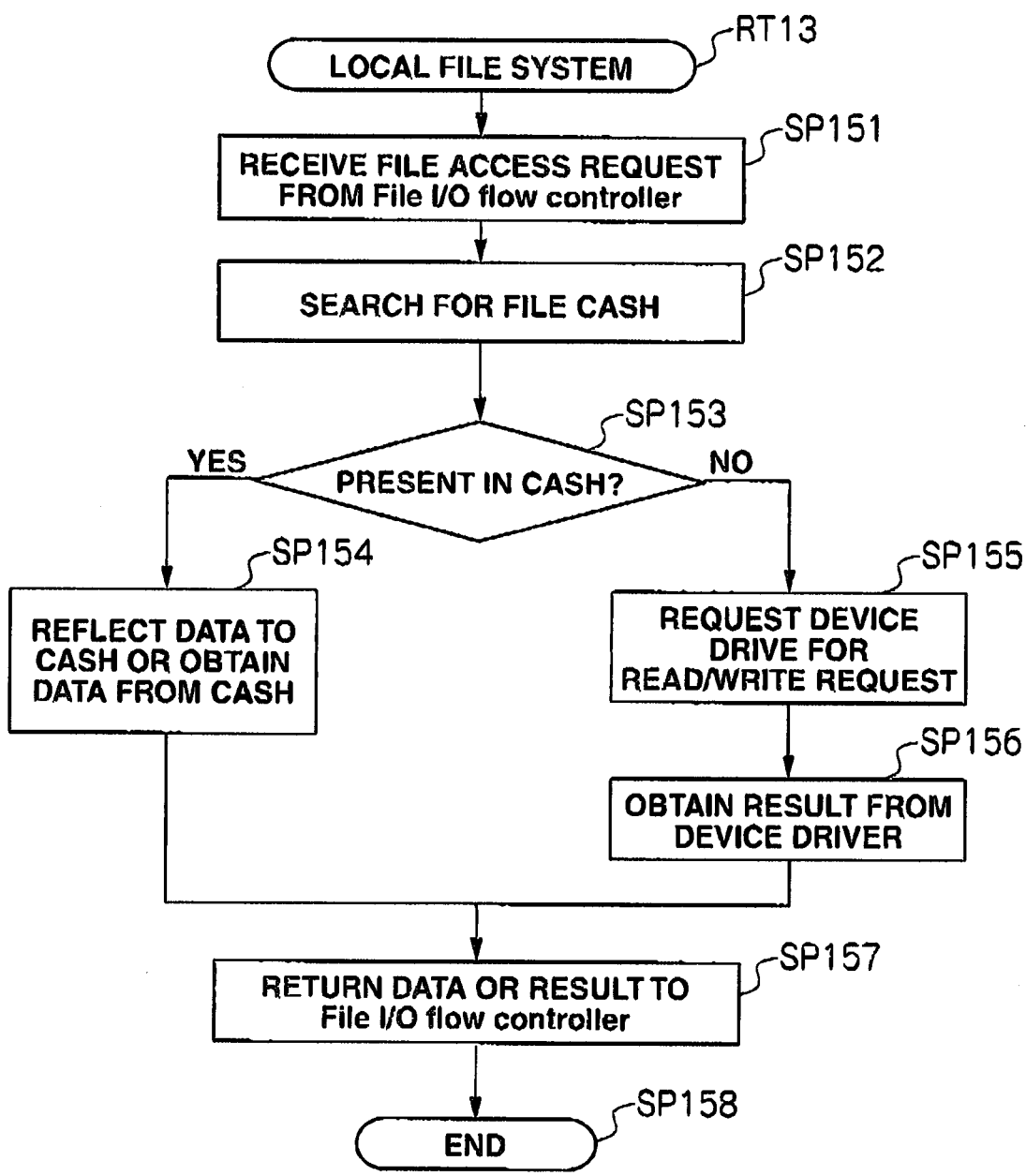
FIG. 35 is a diagram illustrating an example of process of a local file system.

FIG. 35 is a flow chart illustrating process flow of the local file system 58 of the file sharing server 5.

The local file system 58 received a file access request from the file I/O flow controller 53 (a step SP 151). The local file system 58 searches for a file cache 62 (a step SP 152). In the case where the file cache 62 includes file data being an access object (a step SP 153: YES), the local file system 58 reflects the data to the file cache 62 in the WRITE process and obtains data from the file cache 62 in the READ process (a step SP 154). The local file system 58 returns data to the file I/O flow controller 53 (a step SP 157) to finish the process (a step SP 158). On the other hand, in the case where the file cache 62 includes no data (a step SP 153: NO), the local file system 58 makes a data reading and writing request to the device driver 59 (a step SP 155). The local file system 58 receives the result from the device driver 59 (a step SP 156) and returns the result to the file I/O flow controller 53 (a step SP 157) to finish the process (a step SP 158).

Figure 36:
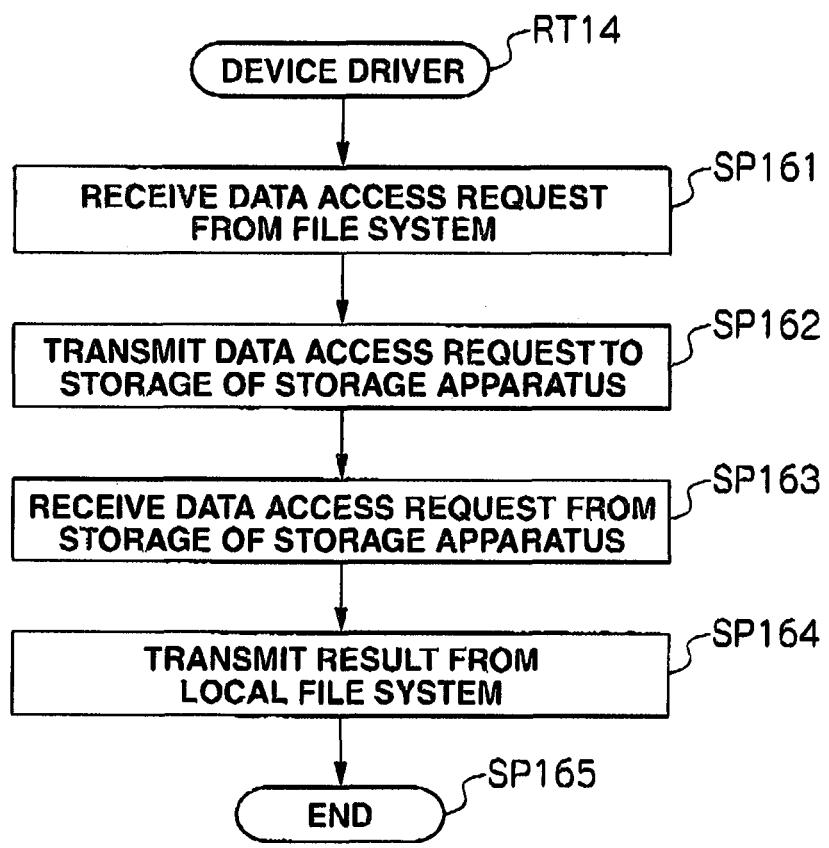
FIG. 36 is a diagram illustrating an example of process of a device driver.

FIG. 36 is a flow chart illustrating process flow of the device driver 59 of the file sharing server 5.

The device driver 59 receives a data access request from the local file system 58 (a step SP 161). The device driver 59 requests the storage 71 of the storage 8 for a data access (a step SP 162) and receives an access result from the storage 71 of the storage 8 (a step SP 163). Lastly, the device driver 59 sends the data access result to the local file system 58 (a step SP 164) to finish the process (a step SP 165).

According to the embodiment described above, the file sharing system 1 will enable an administrator to get load information on the virtual server 7 accurately with the file sharing server 5 in which a plurality of virtual servers 7 are operated. Moreover, the file sharing system 1 will be able to control the I/O amount for each virtual server 7 and file 12 arid can suppress process performance degradation of the other virtual servers 7 even in the case where a large load occurs in a particular virtual server part. Moreover, the file sharing system 1 enables configuration of an important data process and an unimportant data process every file 12 and can suppress only the access to the unimportant data process.

Moreover, the file sharing system 1 obtains the I/O amount prior to the process of the local file system 58 and carries out load control. Thereby, without being influenced by the file cache 62, load control can be carried out. Accordingly, the file sharing system 1 can carry out load control more accurately than the storage 8 controls load.

(2) Embodiment 2

Figure 37:
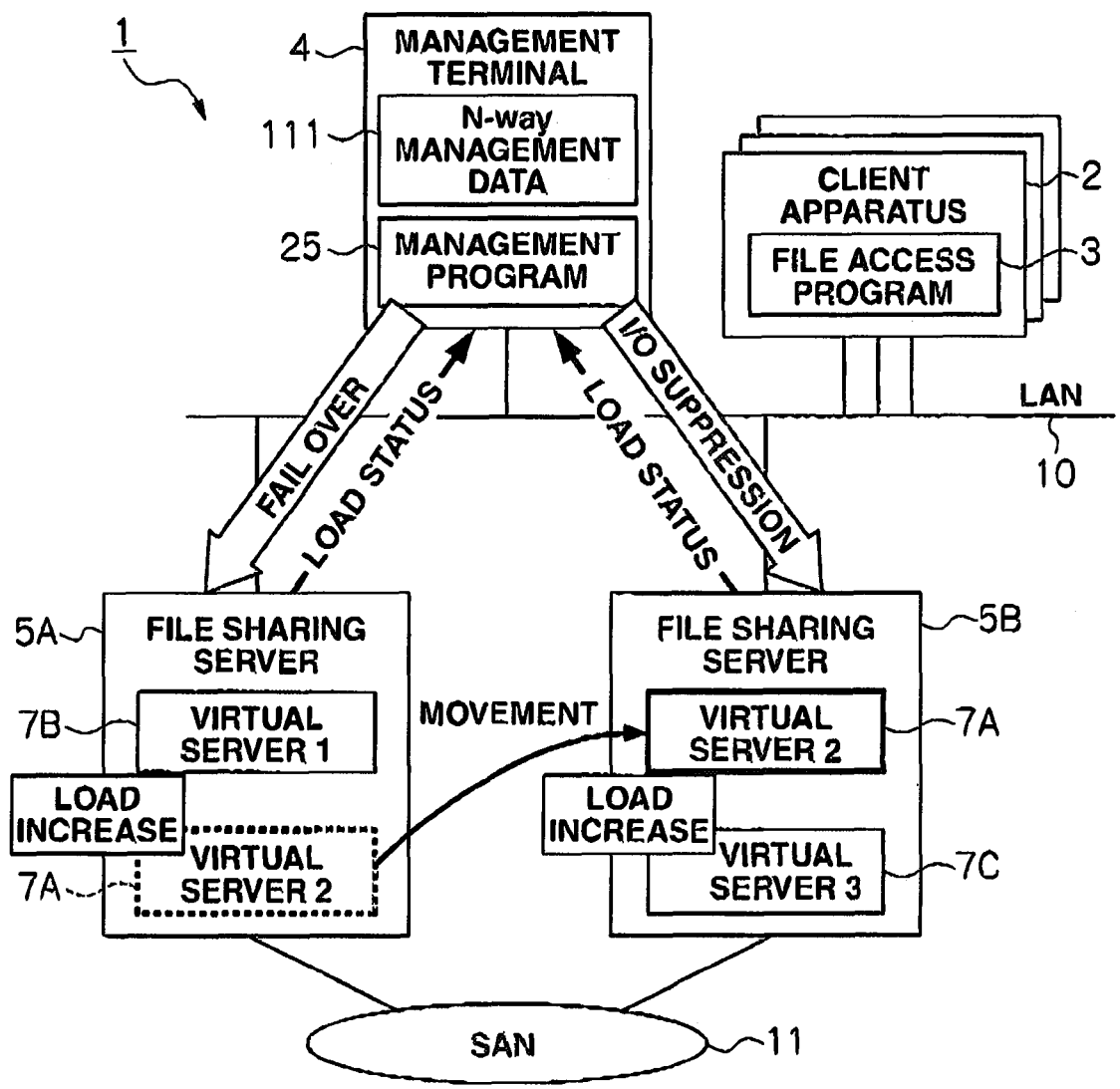
FIG. 37 is a diagram illustrating an example of a system configuration of a file sharing system of an embodiment 2.

FIG. 37 is a system block diagram illustrating a system configuration of a file sharing system 1 related to an embodiment 2 of the present invention. In the embodiment 2, the management terminal 4 includes an N-way cluster management function and controls a load of a plurality of file sharing servers 5 according to N-way management data 111.

An operation summary of the embodiment 2 will be described below. In the embodiment 1, an interface for an administrator to confirm the load status of the respective virtual servers 7 operated with the file sharing servers 5 is present in the management program 25. In the embodiment 2, the management program 25 further manages the load status of the N-way cluster. That is, the management program 25 collects the load status of the file sharing servers 5 configuring the N-way cluster to control the load according thereto.

In FIG. 37, with the file access request of the client apparatus 2, the load to the virtual server 2 (virtual server 7A) of the file sharing server 5A increases. Here, the management program 25 of the embodiment 2 obtains the load status of a file sharing server 5A and a file sharing server 5B. The management program 25 moves (or fails over) the virtual server 2 (virtual server 7A) to the file sharing server 5B according to the N-way management data 111 configured by an administrator. On the other hand, the virtual server 3 (virtual server 7C) restrains an I/O access. As described above, the load is controlled corresponding to the load status of the file sharing server 5 configuring one N-way cluster of the file sharing system 1 related to the embodiment 2.

FIG. 38 is a diagram illustrating the memory 43 of the management terminal 4 and N-way management data 111 stored in the management information 29 of the storage 28.

In the N-way management data 111, the file ID 111A, the virtual server ID 111B, the highly loaded operation 111C and the option 111D are recorded to establish a corresponding relation. The file server ID 111A is an ID of the file sharing server 5 being an object for load control. The virtual server ID 111B is an ID of the virtual server 7 operated with the file sharing server 5 specified with the file server ID 111A. The highly-loaded operation 111C is an operation in the case where the virtual server 7 is determined to be highly loaded. For example, an I/O halt process (read and write halt process) is configured in the highly-loaded operation 111C. The option 111D is an operational option of the highly-loaded operation 111C. For example, the number of seconds of halts (such as 10 seconds) is designated for the N-way management data 111 in the case where the highly-loaded operation 111C is an I/O halt.

By bringing the N-way management data 111, the virtual server I/O amount configuration information 30 and the file I/O amount configuration information 31 into combination, the management program 25 can determine an operation at the time when the respective virtual servers 7 start to be loaded. For example, the management program 25 obtains the I/O amount of the virtual server 7 specified with the file server ID 111A and the virtual server ID 111B from the file sharing server 5 and compares the I/O amount with the READ amount 30C and the WRITE amount 30D of the virtual server I/O amount configuration information 30. Consequently, if the virtual server I/O amount (the virtual server I/O statistics information 83 and the file I/O statistics information 84) is large, the management program 25 carries out an operation at the time of a high load of the N-way management data 111.

FIG. 39 is an example illustrating a command used for an N-way corresponding request command of the embodiment 2 between the management program 25 and the virtual server manager 60.

The N-way corresponding request command 112 is configured by a command number 112A, a virtual server ID 112B, an operation 112C and an option 112D. The command number 112A is an ID for identification from the other commands. The virtual server ID 112B is an ID of the virtual server 7 being an object for a process. The operation 11 2C is a number specifying a process request operation. For example, numbers "100" and "101" are respectively used for the case of the I/O halt and for the case of the virtual server halt. An option 112D is an additional option for specifying the detail of the operation 112C. For example, in the case where the I/O halt time is desired to be configured to 10 seconds, "10" is designated.

Figure 40:
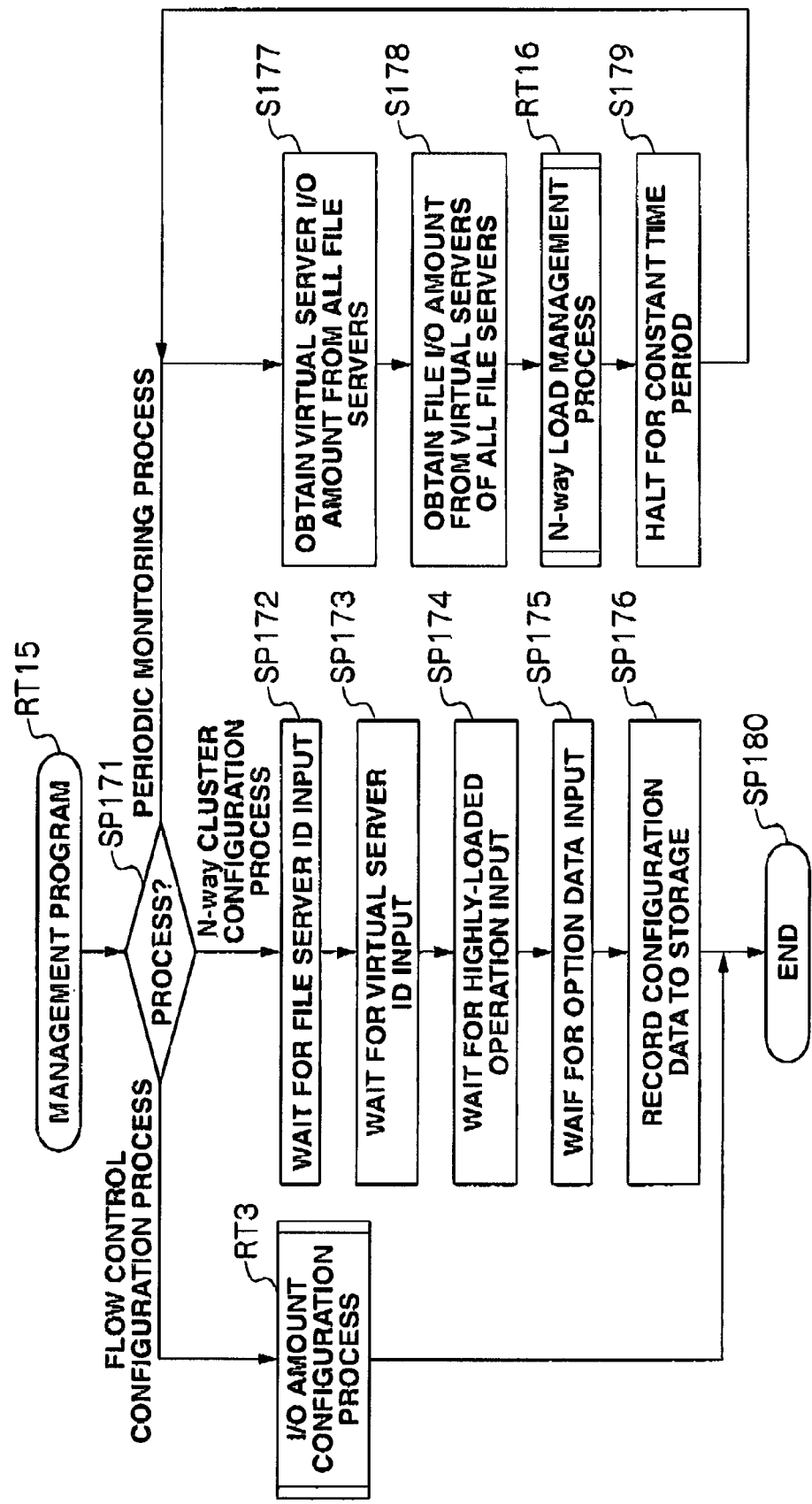
FIG. 40 is a diagram illustrating an example of a management program of the embodiment 2.

FIG. 40 is a flow chart illustrating process flow RT 15 of the management program 25 in the embodiment 2.

management program 25 in the embodiment 2 receives a process request at first and determines the request (a step SP 171).

In the case where the process is a flow control configuration process (a step SP 171: a flow control configuration process, the management program 25 carries out the I/O amount configuration process flow RT 3 described in the embodiment 1 to finish the process (a step SP 180).

On the other hand, in the case of the N-way cluster configuration process (a step SP 172: the N-way cluster configuration process), the management program 25 waits for inputs of the file server ID 111A, the virtual server ID 111B, the highly-loaded operation 111C and an option 111D (a step SP 172 to a step SP 175) and records those data to the management information 29 of the storage 28 as the N-way management data 111 (a step SP 176) to finish the process (a step SP 180).

On the other hand, in the case of a periodic monitoring process (a step SP 171: a periodic monitoring process), the management program 25 requests all the file sharing servers 5 configuring the N-way cluster for acquisition of the virtual server I/O amount (a step SP 177) and requests for acquisition of the file I/O amount from all the file sharing servers 5 (a step SP 178). The management program 25 carries out the N-way load management process (process flow RT 16). The N-way load management process will be described later. The management program 25 resumes the periodic monitoring process from the step SP 177 after a halt for a constant time period (a step SP 179).

Figure 41:
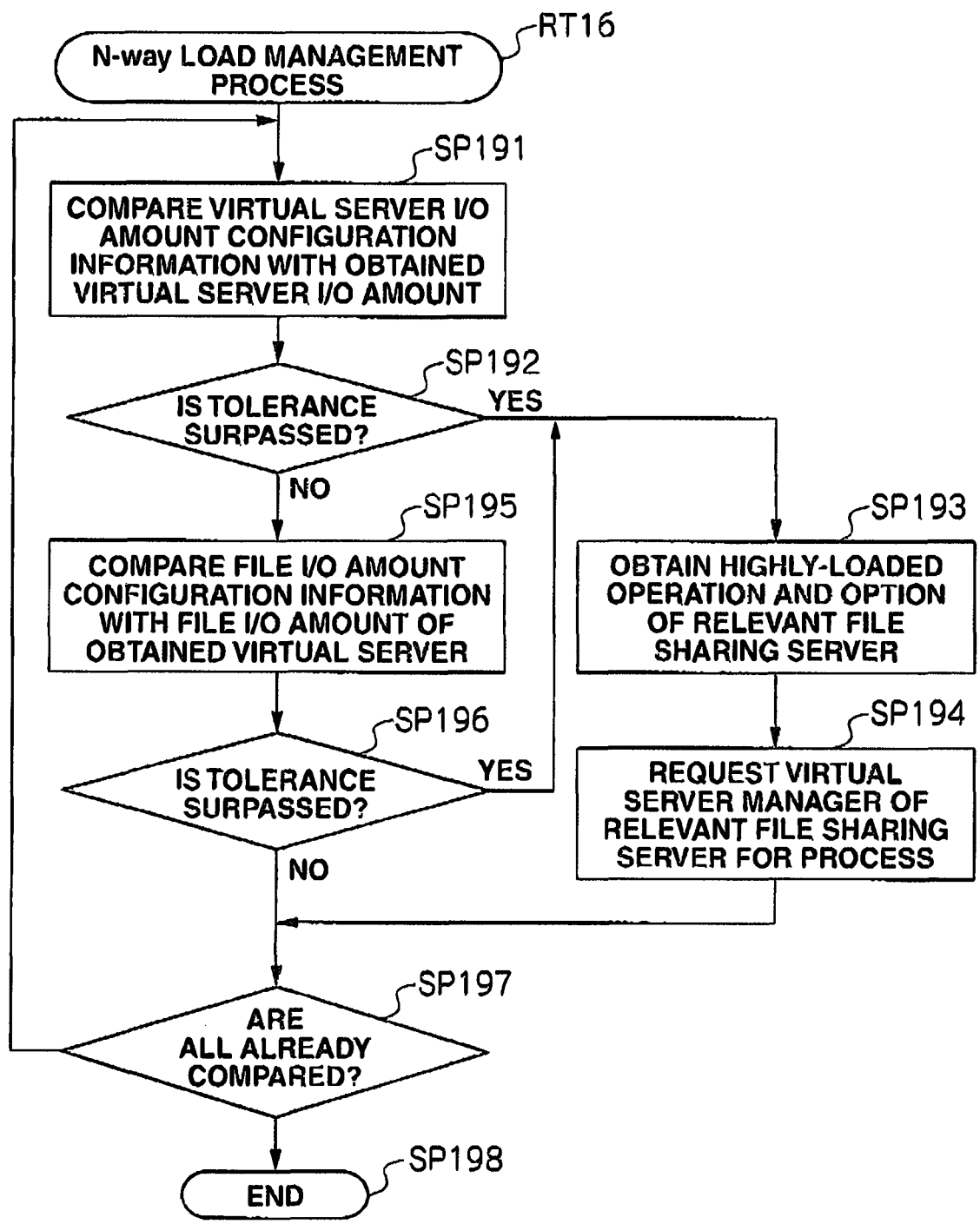
FIG. 41 is a diagram illustrating an example of N-way load management process of a management program of the embodiment 2.

FIG. 41 is a diagram illustrating flow chart of N-way load management process flow RT16 of a management program 25 in the embodiment 2.

The management program 25 compares the virtual server I/O amount obtained in the step SP 177 with the virtual server I/O flow table 81 (a step SP 191). The management program 25 brings the READ amount 81B and the WRITE amount 81C into comparison respectively and, consequently, carries out the highly-loaded operation 111C of the virtual server ID 111B of the N-way management data 111 in the case where the allowed read and write amount is surpassed.

In the case where the load is over the tolerance (a step SP 192: YES), the management program 25 obtains the highly-loaded operation 111C of the virtual server 7 being highly loaded and the option 111D from the N-way management data 111 (a step SP 193). The management program 25 specifies the relevant file sharing server 5 from the file server ID 111A, the virtual server ID 111 8 and the virtual server management information 54 and requests that virtual server manager 60 for a highly-loaded operation 111C (a step SP 194). The management program 25 designates the option 111D at the time of a request. The management program 25 confirms whether comparison on all the virtual servers 7 is completed (a step SP 197) and returns to the step SP 191 in the case where the comparison is not completed (a step SP 197: NO) to continue the process.

The highly-loaded operation 111C includes, for example, an "110 halt" bringing read and write into a compulsive halt and compulsorily cause fail-over. The I/O halt transmits an I/O access halt request to the virtual server manager 60 to become an object. On the other hand, for the fail-over, management program 25 transmits a halt request of that virtual server 7 to virtual server manager 60 of the file sharing server 5 where the virtual server 7 to become an object for fail-over operates. Thereafter, the management program 25 transmits a startup request to the virtual server manager 60 of the other file sharing servers 5 and, thereby, transmits a request for carrying out the fail-over process.

On the other hand, in the case where the step SP 192 determines that the virtual server I/O amount is not surpassed (a step SP 192: NO), likewise the step SP 192, the management program 25 brings the READ amount 82B and the WRITE amount 82C of the file I/O flow table 82 into comparison respectively and carries out a process likewise the step SP 193 and the step SP 194 in the case where the load is determined as over tolerance (a step SP 196: YES). In the case where the load is not over the tolerance (a step SP 196; NO), the process goes forward to a step SP 197. In the case where comparison of all the virtual servers 7 is completed (SP 197. YES), the management program 25 finishes the process (SP 198).

As described above, the management program 25 can manage the N-way cluster state in a concentrated manner. The management program 25 can move the virtual server 7 with a load becoming higher to the other file sharing servers 5 and temporarily halt the read and write process of the program operated with the virtual server 7. Consequently, the management program 25 of the management terminal 4 can cause an administrator to control load balancing in all the N-way clusters.

Figure 42:
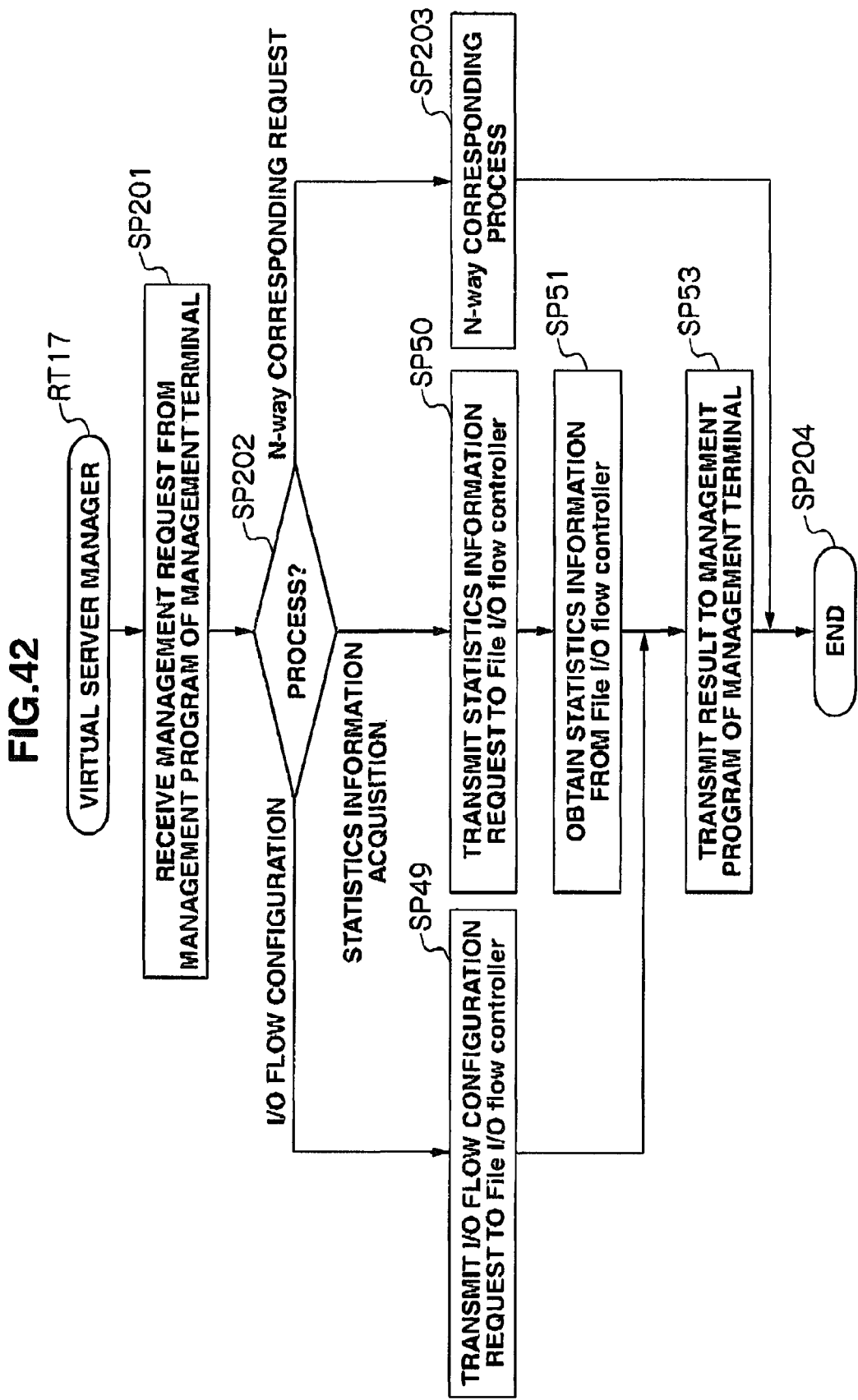
FIG. 42 is a diagram illustrating an example of process of a virtual server manager.

FIG. 42 is a flow chart illustrating process flow RT 17 of the virtual server manager 60 in the embodiment 2.

The virtual server manager 60 of the embodiment 2 operates based on instruction from the management program 25. For example, no periodic monitoring of the virtual server 7 with a timer as in the embodiment is carried out. Instead, the virtual server manager 60 operates in receipt of the requested process of the management program 25.

At first, the virtual server manager 60 receives a process request from the management program 25 (a step SP 201) and determines the process. Among the processes, the I/O flow configuration and the statistics information acquisition process have already been described in the step SP 49 to the step SP 51 and the step SP 53 of the embodiment 1. In the embodiment 2, the N-way corresponding request process is newly added. The virtual server manager 60 carries out (a step SP 203) an I/O halt and a fail-over process of the virtual server 7 to finish the process (a step SP 204) based on the highly-loaded operation 111C received from the management program 25 in the N-way corresponding process (a step SP 203). The I/O halt of the virtual server 7 is realized by configuring the READ amount 81B and the WRITE amount 81C of the virtual server I/O flow table 81 being an object for the halt to "0" during the number of second designated by the option 111D.

For fail-over, the virtual server manager 60 halts the virtual server 7 to become an object for fail-over. Thereafter, the management program 25 starts up the virtual server 7 halted by the other file sharing servers 5 designated by the option 111D.

According to the second embodiment described above, the management program 25 of the management terminal 4 can manage the load status in a concentrated matter in the N-way cluster operated with a plurality of virtual servers 7 and can restrain the operation of the virtual server 7 surpassing the I/O load configured by an administrator based on the operation at the time of a high load configured by the administrator.

According to the first and the second embodiments described above, in the file sharing system 1, access information (file I/O information) every file 12 provided by the virtual server 7 can be obtained. In addition, in the file sharing system 1, the administrator of the file sharing server 5 confirms that file I/O information and, thereby, can estimate the load status of the virtual server 7 accurately. Moreover, the file sharing system 1 restrains the file access temporarily based on the file I/O amount information and the file I/O information configured by the administrator of the file sharing server 5, thereby, carries out file I/O flow control, compulsorily suppresses the operation of the virtual server 7 where a large load occurs, and thereby can restrain mobility of the virtual server 7 during an important data process.

Accordingly, the file sharing system 1 can solve such a problem that it will become necessary to obtain accurate load information every virtual server 5 in the case where the virtual server 7 is configured by the file sharing server 5, and moreover virtual server movement occurs during an important data process in the case of the N-way cluster configuration The present invention is widely applicable to a file sharing server providing a virtual server environment.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A server system comprising:
a plurality of client computers;
a plurality of file sharing servers coupled to the plurality of client computers, and including a processor and a memory; and
a storage apparatus coupled to the plurality of file sharing servers;
wherein the plurality of client computers transmit/receive file data to/from the storage apparatus via the plurality of file sharing servers,
wherein the processor provides a plurality of virtual servers controlling the file data from the plurality of client computers,
wherein each of the plurality of file sharing servers comprises a manager for the plurality of virtual servers, a virtual file system, a file I/O flow controller and a local file system,
wherein the memory has configuration information including I/O amount information for the virtual servers which comprises an ID of the virtual servers, a read amount corresponding to the ID of the virtual servers and a write amount corresponding to the ID of the virtual servers, and I/O amount information for the file data which comprises a file path of the file data, a read amount corresponding to the file path and a write amount corresponding to the file path,
statistics information including I/O amount information of one of the virtual servers which comprises a read amount, a write amount, a total read amount and a total write amount, and I/O amount information of the file data which includes a read amount, a write amount, a total read amount and a total write amount, and
mobility management information including the ID of the virtual servers and the file path,
wherein the virtual file system receives a file access request from the plurality of virtual servers, transmits the file access request to the file I/O flow controller, receives a result of the file access request and transmits the result of the file access request to the plurality of virtual servers,
wherein the local file system receives the file access request, retrieves file data of the file access request on the memory and obtains the file data of the file access request from the memory in case that the file data of the file access request is in the memory or from the storage apparatus in case that the file data of the file access request is not in the memory,
wherein the file I/O flow controller receives the file access request,
determines whether the file access request is a read request or a write request,
in case that the file access request is a read request,
calculates a read amount per unit time by referring to the statistics information,
determines whether the read amount per unit time is larger than a set read amount for the plurality of virtual servers and a set read amount for the file data by referring to the I/O amount information for virtual servers and the statistics information, and
halts the file access request for a predetermined time if the read amount per unit time is larger than the set read amount for the plurality of virtual servers and the set read amount for the file data, in case that the file access request is a write request,
calculates a write amount per unit time by referring to the statistics information,
determines whether the write amount per unit time is larger than a set write amount for the plurality of virtual servers and a set write amount for the file data by referring to the I/O amount information for virtual servers and the statistics information, and
halts the file access request for predetermined time if the write amount per unit time is larger than the set write amount for the plurality of virtual servers and the set write amount for the file data, and wherein the manager for the plurality of virtual servers, on a regular basis, determines whether an I/O amount of the statistics information as a tolerant I/O amount is larger than an I/O amount of the I/O amount information for each of the plurality of virtual servers by referring to the I/O amount information for virtual servers and the statistics information, determines whether an important file of the determined virtual server is utilized by referring to the mobility management information if the I/O amount of the I/O amount information is larger than the I/O amount of the statistics information, and migrates the determined virtual server to another sharing server.

2. A control method for a server system which comprises:

a plurality of client computers;

a plurality of file sharing servers coupled to the plurality of client computers, and including a processor and a memory; and a storage apparatus coupled to the plurality of file sharing servers;

wherein each of the plurality of file sharing servers comprises a manager for a plurality of virtual servers which is provided by the processor and controls file data from the plurality of client computers to the storage apparatus via the plurality of file sharing servers, a virtual file system, a file I/O flow controller and a local file system, wherein the memory has configuration information including I/O amount information for the virtual servers which comprises an ID of the virtual servers, a read amount corresponding to the ID of the virtual servers and a write amount corresponding to the ID of the virtual servers, and I/O amount information for the file data which comprises a file path of the file data, a read amount corresponding to the file path and a write amount corresponding to the file path, statistics information including I/O amount information of one of the virtual servers which comprises a read amount, a write amount, a total read amount and a total write amount, and I/O amount information of the file data which includes a read amount, a write amount, a total read amount and a total write amount, and mobility management information including the ID of the virtual servers and the file path, the control method comprising the steps of:

receiving, by the virtual file system, a file access request from the plurality of virtual servers, transmitting, by the virtual file system, the file access request to the file I/O flow controller, receiving, by the virtual file system, a result of the file access request, transmitting, by the virtual file system, the result of the file access request to the plurality of virtual servers, receiving, by the local file system, the file access request, retrieving, by the local file system, file data of the file access request on the memory, obtaining, by the local file system, the file data of the file access request from the memory in case that the file data of the file access is in the memory or from the storage apparatus in case that the file data file access request is not in the memory, receiving, by the file I/O flow controller, the file access request, determining, by the file I/O flow controller, whether the file access request is a read request or a write request, in case that file access request is a read request, calculating, by the file I/O flow controller, a read amount per unit time by referring to the statistics information, determining, by the file I/O flow controller, whether the read amount per unit time is larger than a set read amount for the plurality of virtual servers and a set read amount for the file data by referring to the I/O amount information for virtual servers and the statistics information, and halting, by the file I/O flow controller, the file access request for a predetermined time if the read amount per unit time is larger than the set read amount for the plurality of virtual servers and the set read amount for the file data, in case that file access request is a write request, calculating, by the file I/O flow controller, a write amount per unit time by referring to the statistics information, determining, by the file I/O flow controller, whether the write amount per unit time is larger than a set write amount for the plurality of virtual servers and a set write amount for the file data by referring to the I/O amount information for virtual servers and the statistics information, and halting, by the file I/O flow controller, the file access request for a predetermined time if the write amount per unit time is larger than the set write amount for the plurality of virtual servers and the set write amount for the file data, determining, by the manager for the plurality of virtual servers on a regular basis, whether an I/O amount of the statistics information as a tolerant I/O amount is larger than an I/O amount of the I/O amount information for each of the plurality of virtual servers by referring to the I/O amount information for virtual servers and the statistics information, determining, by the manager for the plurality of virtual servers, whether an important file of the determined virtual server is utilized by referring to the mobility management information if the I/O amount of the I/O amount information is larger than the I/O amount of the statistics information, and migrating, by the manager for the plurality of virtual servers, the determined virtual server to another sharing server.

* * * * *